(12) United States Patent
Pietrzyk et al.

(10) Patent No.: US 8,948,311 B2
(45) Date of Patent: Feb. 3, 2015

(54) RECEIVER AND METHOD FOR DETERMINING A TIME MEASURE DEPENDING ON A TIME OF ARRIVAL OF A PULSE SIGNAL

(75) Inventors: Michal Miroslaw Pietrzyk, Erlangen (DE); Thomas Van Der Gruen, Kleinsendelbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 733 days.

(21) Appl. No.: 13/228,238

(22) Filed: Sep. 8, 2011

(65) Prior Publication Data

US 2012/0063547 A1 Mar. 15, 2012

(30) Foreign Application Priority Data

Sep. 8, 2010 (EP) .................................... 10175811

(51) Int. Cl.
*H03K 9/00* (2006.01)
*H04L 1/02* (2006.01)
*G01S 11/02* (2010.01)
*H04B 1/7163* (2011.01)

(52) U.S. Cl.
CPC ............ *G01S 11/02* (2013.01); *H04B 1/71637* (2013.01)
USPC .......................................... 375/316; 375/347

(58) Field of Classification Search
CPC ......... G01S 5/14; G01S 5/06; H04B 1/70754; H04B 1/709; A01K 11/008
See application file for complete search history.

(56) References Cited

U.S. PATENT DOCUMENTS 5,038,406 A * 8/1991 Titterton et al. ............... 398/125
7,526,048 B2 * 4/2009 Sahinoglu et al. ............ 375/316
8,314,736 B2 * 11/2012 Moshfeghi ..................... 342/465
(Continued)

FOREIGN PATENT DOCUMENTS

| EP | 1940036 | 2/2008 |
|---|---|---|
| WO | WO 2005/074150 | 8/2005 |
| WO | WO 2007/018133 | 2/2007 |
| WO | WO 2007/088211 | 8/2007 |

OTHER PUBLICATIONS

Cheong, Paul et al: "Synchronization, TOA and Position Estimation for Low-complexity LDR UWB Devices", Ultra-Wideband, 2005 IEEE International Conference on Zurich, Switzerland Sep. 5-8, 2005, pp. 480-484.

(Continued)

*Primary Examiner* — Tesfaldet Bocure
(74) *Attorney, Agent, or Firm* — Michael A. Glenn; Perkins Coie LLP

(57) ABSTRACT

A receiver for determining a time measure depending on a time of arrival of a pulse signal having a sequence of pulses from a transmitter includes an integrator having a variable and controllable integration window, extending from a starting point to an integrator sampling point, an integrator controller for controlling the integration window in a time-successive way so that the sampling points of successive integration windows are changed by a time delay from a current integration window to a later integration window, wherein the time delay is smaller than half of the integration window, and an output processor for generating the time measure as an indication indicating which later integration window has a sampled integrator value exceeding a threshold or being larger than a sampled integrator value for a timely preceding or timely succeeding integration window.

18 Claims, 16 Drawing Sheets

(56) References Cited

U.S. PATENT DOCUMENTS

| | | | |
|---|---|---|---|
| 2002/0038294 A1* | 3/2002 | Matsugu | 706/20 |
| 2002/0190786 A1 | 12/2002 | Yoon et al. | |
| 2003/0227961 A1 | 12/2003 | Batra et al. | |
| 2005/0002481 A1* | 1/2005 | Woo et al. | 375/354 |
| 2005/0069059 A1 | 3/2005 | Krivokapic | |
| 2008/0186231 A1* | 8/2008 | Aljadeff et al. | 342/387 |
| 2009/0028221 A1* | 1/2009 | Sahinoglu et al. | 375/138 |
| 2009/0058729 A1* | 3/2009 | Jo | 342/387 |
| 2010/0279707 A1* | 11/2010 | Fischer et al. | 455/456.1 |
| 2011/0050501 A1* | 3/2011 | Aljadeff | 342/387 |
| 2011/0116436 A1* | 5/2011 | Bachu et al. | 370/312 |
| 2011/0287801 A1* | 11/2011 | Levin et al. | 455/517 |
| 2012/0013509 A1* | 1/2012 | Wisherd et al. | 342/451 |

OTHER PUBLICATIONS

Guvenc, II; Threshold-Based TOA Estimation for Impulse Radio UWB Systems, Dec. 2005 pp. 1-7.

Verhelst M et al: "A reoonfigurable, 0.13A[mu]m CMOS 110pJ/pulse, fully integrated IR-UWB receiver for communication and sub-cm ranging", Solid-State Circuits Conference—Digest of Technical Papers, 2009, ISSCC 2009, pp. 250-251, 251A.

Verhelst M et al: "A Low Power, Reconfigurable IR-UWB System", Communications, 2008, IEEE, pp. 3771-3774.

Yu K et al: "UWB location and tracking for wireless embedded networks", Signal Processing, Elsevier Science Publishers B.V. Amsterdam, NL, vo 1 . 86, No. 9, Sep. 1, 2006, pp. 2153-2171.

* cited by examiner (RECEIVER)

(PROCESSED SIGNALS AT DIFFERENT PROCESSING STAGES)

(TIME DELAY UNIT)

(INTEGRATOR CONTROLLER)

(RC INTEGRATION UNIT)

(OUTPUT PROCESSOR)

(DISTRIBUTION OF SAMPLED INTEGRATOR VALUES)

(ANALOG-TO-DIGITAL CONVERTER)

(RECEIVER FOR DETERMINING A LOCALIZATION)

RECEIVER AND METHOD FOR DETERMINING A TIME MEASURE DEPENDING ON A TIME OF ARRIVAL OF A PULSE SIGNAL

CROSS-REFERENCE TO RELATED APPLICATIONS

This application claims priority to European Patent Application No. 10175811.8 filed Sep. 8, 2010.

BACKGROUND OF THE INVENTION

Embodiments of the present invention relate to wireless ultra-wideband (UWB) ranging and localization systems, and in particular, to a concept for determining a time measure depending on a time of arrival of a pulse signal having a sequence of pulses from a transmitter. Further embodiments of the present invention relate to an energy receiver architecture for UWB ToA (time of arrival) estimation.

Ultra-wideband Impulse Radio (UWB-IR) has several unique characteristics that make it a promising candidate for future wireless localization. The large absolute bandwidth, in the US from 3.1 to 10.6 GHz and in Europe from 6 to 8.5 GHz, corresponds to a very fine time resolution in the order of hundreds of picoseconds which translates to spatial resolution in the order of centimeters. The very fine time resolution allows a direct path to be easily distinguished from the reflected paths. This is of paramount importance in indoor environments where other localization systems suffer from the multipath phenomenon. The presence of low frequency components in the UWB signal spectrum enables penetration of the UWB signals through the walls. UWB devices are permitted to transmit very weak signals so that other systems sharing the same spectrum, including for instance IEEE 802.11a WLANs, are protected. Low interference, possibility of high device density and low probability of detection and interception (LPD/I) are these characteristics of the UWB technology that are of particular importance for military applications. Furthermore, the UWB technology promises prospects for long-life battery operation and low cost mainly thanks to simple transceiver implementations.

However, the same properties provide design challenges, such as high sampling rate, synchronization and power control. Portable devices impose strict requirements on the size and shape of the antenna which has to radiate effectively in a wide frequency band and under varying propagation conditions sometimes including near-field, e.g. when carried on the human body or close objects. To ensure a further development of the UWB technology and a wide presence of its products on the commercial market of tomorrow, these challenges may be properly addressed and resolved.

Reception of UWB signals poses challenges in the receiver structure. According to the state-of-the-art, an optimal estimate of ToA may be performed by means of a conventional matched filter/correlation receiver.

An example of a correlating receiver is presented in US 2005/0069059 A1, where a pulse sequence energy estimator and a complicated architecture may be used. US 2003/0227961 A1 describes a RAKE architecture for an UWB receiver. The architecture is based on a bank of switched capacitors and involves using high sampling rate.

A low complexity alternative to the matched filter or RAKE receiver is the energy detection (ED) receiver. WO 2005/074150 A1 presents a non-coherent receiver based on the ED architecture that is suitable for communication applications with PAM (pulse amplitude modulation) and PPM (pulse position modulation) schemes. Here, it is proposed to perform a weighting integration operation. U.S. Pat. No. 7.526.048 B2 describes a method for selecting the threshold in the ED-receiver based ToA ranging system. It is proposed to use kurtosis of the signal after an integration step in the ED. Another method of setting the threshold is presented in Ismail Guvenc and Zafer Sahinoglu, "Threshold-Based TOA Estimation for Impulse Radio UWB Systems", IEEE International Conference on Ultra-Wideband. ICU 2005. This method is based on normalized value according to the signal-to-noise value and integration window size.

However, a general problem of known receivers is that they are characterized by relatively low time/distance resolution and have a relatively complex structure.

SUMMARY

According to an embodiment, a receiver for determining a time measure depending on a time of arrival of a pulse signal having a sequence of pulses from a transmitter may have: an integrator having a variable and controllable integration window, extending from a starting point to an integrator sampling point; an integrator controller for controlling the integration window in a time-successive way so that the sampling points of successive integration windows are changed by a time delay from a current integration window to a later integration window, wherein the time delay is smaller than half of the integration window; and an output processor for generating the time measure as an indication indicating which later integration window has a sampled integrator value exceeding a threshold or being larger than a sampled integrator value for a timely preceding or timely succeeding integration window.

According to another embodiment, a receiver for determining a localization of the same may have: a plurality of receivers according to claim 1 for determining at least two different ToAs of pulse signals each having a sequence of pulses from a plurality of transmitters; and a position calculator for calculating a current position of the receiver depending on the at least two different ToAs.

According to another embodiment, a method for determining a time measure depending on a time of arrival of a pulse signal having a sequence of pulses from a transmitter may have the steps of: providing a variable and controllable integration window, extending from a starting point to an integrator sampling point; controlling the integration window in a time-successive way so that the sampling points of successive integration windows are changed by a time delay from a current integration window to a later integration window, wherein the time delay is smaller than half of the integration window; and generating the time measure as an indication indicating which later integration window has a sampled integrator value exceeding a threshold or being larger than a sampled integrator value for a timely preceding or a timely succeeding integration window.

According to another embodiment, a method for determining a localization of a receiver may have the steps of determining at least two different ToAs of pulse signals each having a sequence of pulses from a plurality of transmitters; and calculating a current position of the receiver depending on the at least two different ToAs.

Another embodiment may have a computer program having a program code for performing the method for determining a time measure depending on a time of arrival of a pulse signal having a sequence of pulses from a transmitter, which method may have the steps of: providing a variable and controllable integration window, extending from a starting point to an integrator sampling point; controlling the integration window in a time-successive way so that the sampling points of successive integration windows are changed by a time delay from a current integration window to a later integration window, wherein the time delay is smaller than half of the integration window; and generating the time measure as an indication indicating which later integration window has a sampled integrator value exceeding a threshold or being larger than a sampled integrator value for a timely preceding or a timely succeeding integration window, when the computer program is executed on the computer.

Another embodiment may have a computer program having a program code for performing the method for determining a localization of a receiver, which method may have the steps of: determining at least two different ToAs of pulse signals each having a sequence of pulses from a plurality of transmitters; and calculating a current position of the receiver depending on the at least two different ToAs, when the computer program is executed on the computer.

According to an embodiment of the present invention, the receiver for determining a time measure depending on a time of arrival of a pulse signal having a sequence of pulses from a transmitter comprises an integrator, an integrator controller and an output processor. In particular, the integrator has a variable and controllable integration window, extending from a starting point to an integrator sampling point. The integrator controller is configured for controlling the integration window in a time-successive way so that the sampling points of successive integration windows are changed by a time delay from a current integration window to a later integration window, wherein the time delay is smaller than half of the integration window. The output processor is configured for generating the time measure as an indication indicating which later integration window has a sampled integration value exceeding a threshold or being larger than a sampled integrator value for a timely preceding or timely succeeding integration window.

The basic idea underlying the present invention is that the above-mentioned higher resolution and/or efficient implementation can be achieved when a variable and controllable integration window is provided, extending from a starting point to an integrator sampling point, and the integration window is controlled in a time-successive way so that the sampling points of successive integration windows are changed by a time delay from a current integration window to a later integration window, wherein the time delay is smaller than half of the integration window. By this measure, a poor time resolution and a corresponding relatively large time of arrival estimation error can be prevented with relatively low effort, thereby realizing an improved concept of an efficient receiver.

According to a further embodiment of the present invention, the integrator comprises a time delay unit controlled by the integrator controller, wherein the time delay unit is configured for delaying the pulse signal by increasing time delays over several successive pulses based on a control signal output by the integrator controller. This measure enables to controllably increase the time resolution, which essentially depends on how often time delays have been successively introduced.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
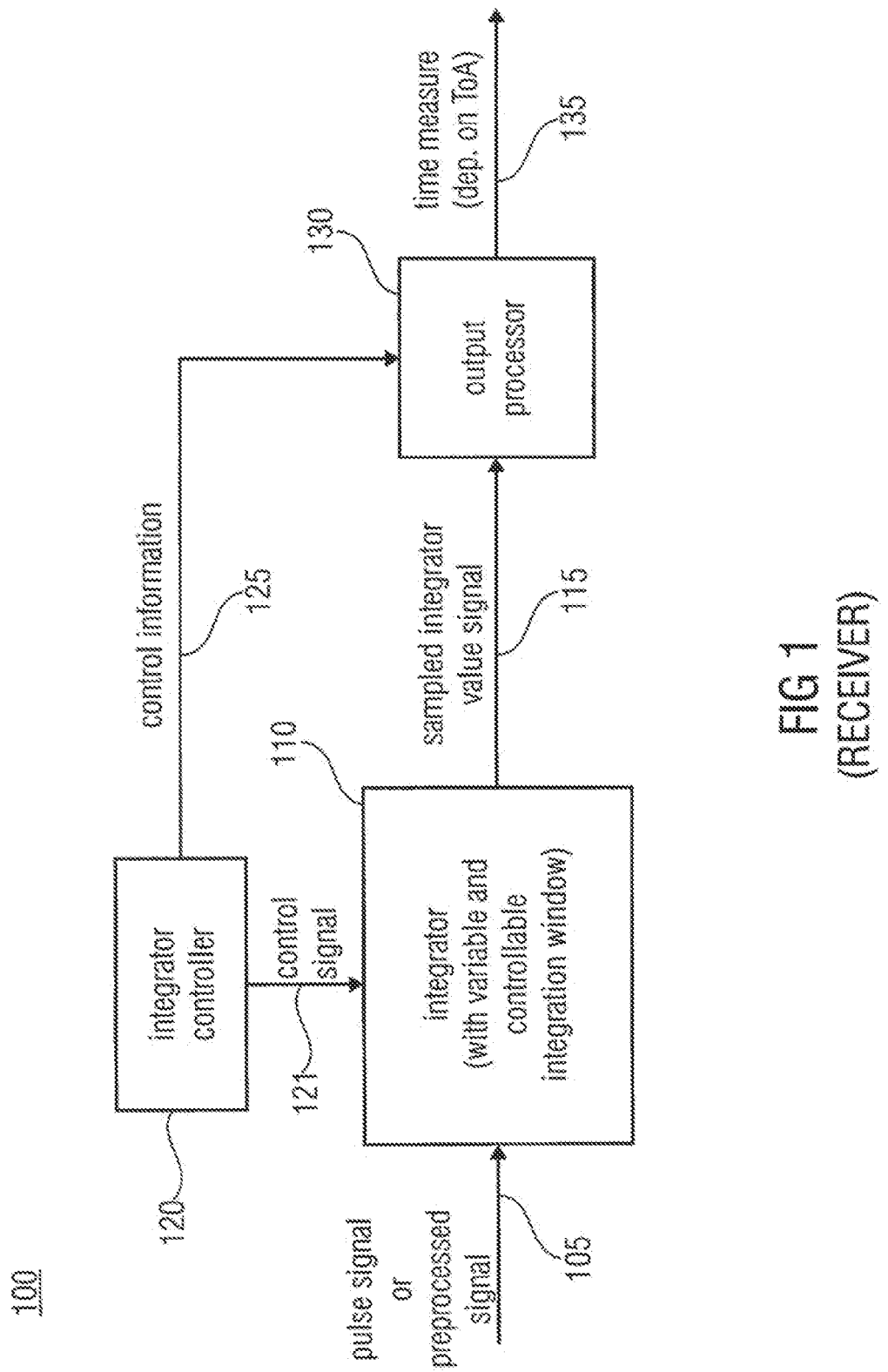
FIG. 1 shows a block diagram of an embodiment of the receiver for determining a time measure depending on a time of arrival of a pulse signal.

FIG. 1 shows a block diagram of an embodiment of the receiver 100 for determining a time measure depending on a time of arrival of a pulse signal 105. The pulse signal 105 may be transmitted from a transmitter having a sequence of pulses.

Here, each pulse of the sequence of pulses may represent a band-limited pulse such as a UWB pulse. The receiver 100 is configured to receive the transmitted pulse signal or a preprocessed version (e.g. a squared version) thereof. As shown in FIG. 1, the receiver 100 comprises an integrator 110, an integrator controller 120 and an output processor 130. In particular, the integrator 110 has a variable and controllable integration window, extending from a starting point to an integrator sampling point. The integrator controller 120 may be configured for controlling the integration window in a time-successive way so that the sampling points of successive integration windows are changed by a time delay from a current integration window to a later integration window. Here, the time delay may be smaller than half of the integration window. At the output of the integrator 110, the sampled integrator value signal 115 will be obtained. The output processor 130 may be configured for generating the time measure 135 as an indication indicating which later integration window has a sampled integrator value exceeding a threshold. Here, the indication may also be based on a comparison of the sampled integrator value with a sampled integrator value for a timely preceding or timely succeeding integration window. In the embodiment of FIG. 1, the integrator controller 120 may provide a control signal 121 for the integrator 110 and a control information 125 for the output processor 130.

Figure 2:
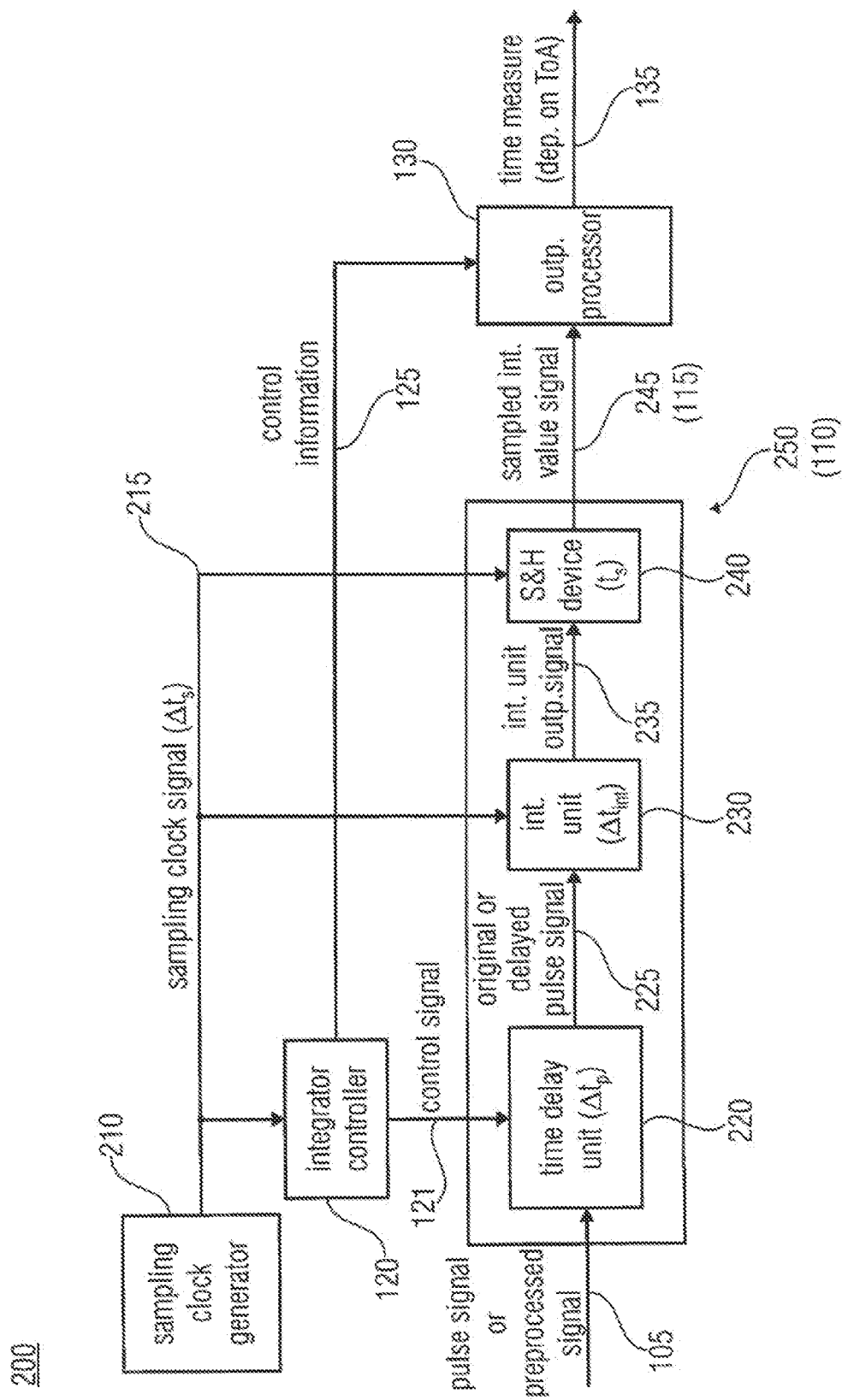
FIG. 2 shows a block diagram of a further embodiment of the receiver for determining a time measure depending on a time of arrival of a pulse signal in more detail.

FIG. 2 shows a block diagram of a further embodiment of the receiver 200 for determining a time measure depending on a time of arrival of a pulse signal in more detail. The receiver 200 of FIG. 2 essentially comprises the same blocks as the receiver 100 of Fig. I. Therefore, identical blocks having similar implementations and/or functions are denoted by the same numerals. In addition, the receiver 200 further comprises a sampling clock generator 210 for generating a sampling clock signal 215. It can be seen in FIG. 2 that the sampling clock generator 210 is connected to the integrator controller 120. In embodiments, the integrator controller 120 may be configured to introduce the time delay $\Delta t_p$ based on the sampling clock signal 215.

Specifically, the integrator controller 120 may be set so that the time delay $\Delta t_p$ will be introduced for each predetermined $(N_s+1)$th pulse of the sampling clock signal 215.

Referring to FIG. 2, the integrator 250, which may correspond to the integrator 110 of FIG. 1, may be configured to integrate an original or delayed pulse signal 225 one time and not more than one time between two time adjacent clock events.

In particular, the integrator 250 may be set so that the integration will be performed within a predefined integration window $\Delta t_{int}$ being smaller than or equal to a sampling clock period $\Delta t_s$. Here, the sampling clock period $\Delta t_s$ is typically defined by a time distance between two time adjacent clock events provided by the sampling clock signal 215. As shown in FIG. 2, an appropriate timing of the delay and integration operations such as within the integrator 250 can essentially be realized by using a same sampling clock signal (e.g. sampling clock signal 215) generated by the sampling clock generator 210.

In the FIG. 2 embodiment, the integrator 250 of the receiver 200 may comprise a time delay unit 220 which is controlled by the integrator controller 120. In particular, the time delay unit 220 may be configured for delaying the pulse signal 105 by increasing time delays over several successive pulses based on a control signal 121 output by the integrator controller 120. As depicted in FIG. 2, the integrator 250 of the receiver 200 furthermore comprises an integration unit 230 and a sampling and hold device 240.

In short, the integration unit 230 is configured for integrating the original or delayed pulse signal 225 output by the time delay unit 220 to obtain an integration unit output signal 235, while the sampling and hold device is configured for sampling the integration unit output signal 235 output by the integration unit 230 to obtain a sampled integrator value signal 245. Here, the sampled integrator value signal 245 output by the integrator 250 of FIG. 2 may correspond to the sampled integrator value signal 115 output by the integrator 110 of FIG. 1. The output processor 130 may be configured to be operative on the sampled integrator value signal 245 to determine the time measure 135 based on the control information 125 provided by the integrator controller 120. More details of the individual processing blocks such as employed by the receivers 100; 200 will be described later.

Figure 3:
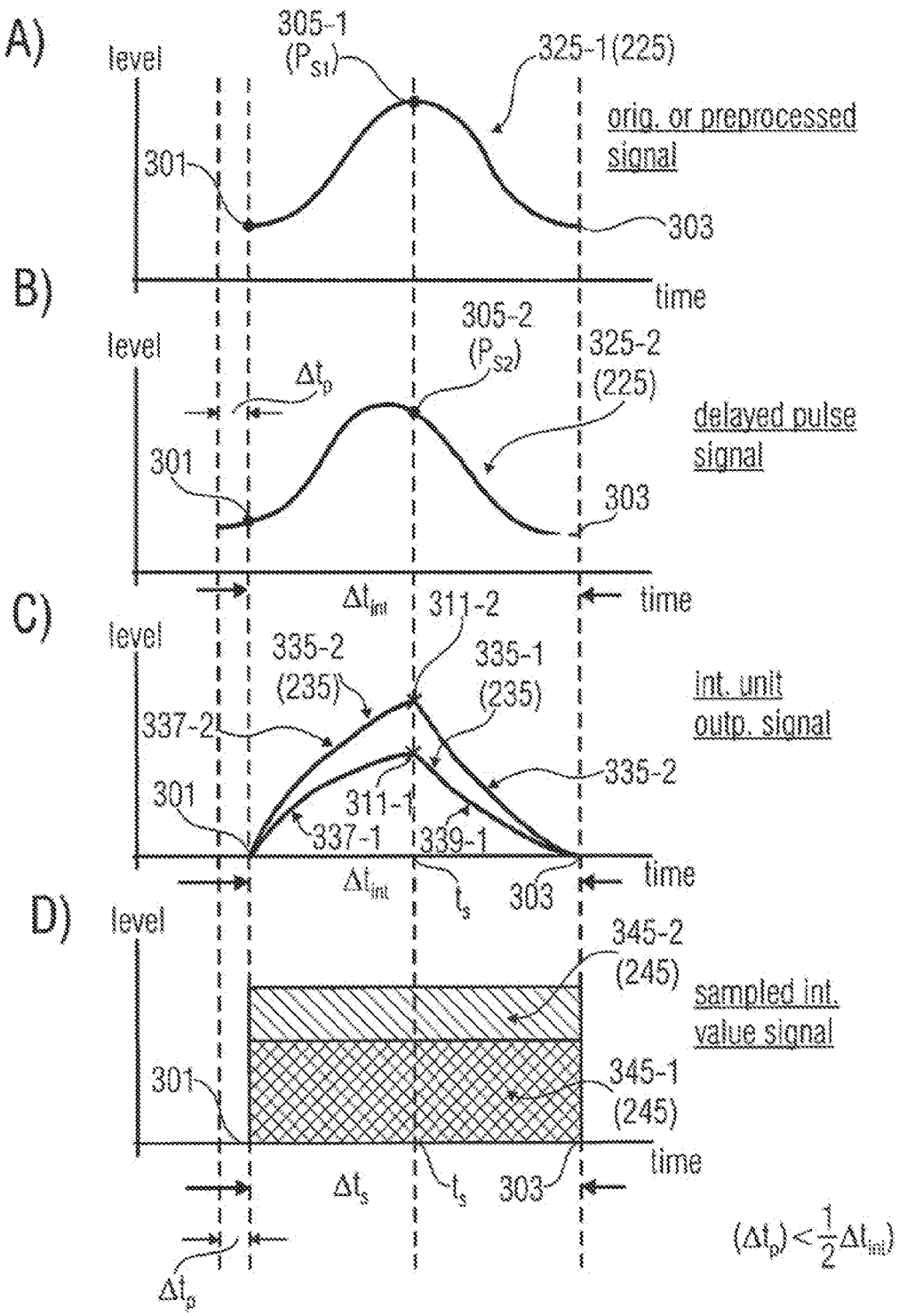
FIG. 3a shows a time plot of an exemplary original or preprocessed pulse signal.
FIG. 3b shows a time plot of an exemplary delayed pulse signal with a time delay ($\Delta t_p$)
FIG. 3c shows two time plots of integration unit output signals based on the exemplary original or delayed pulse signal of FIG. 3a and FIG. 3b, respectively.
FIG. 3d shows two time plots of sampled integrator value signals based on the integration unit output signals of FIG. 3c.

FIGS. 3a; 3b; 3c; 3d show time plots of different exemplary processed signals 225, 235, 245, which are present at different processing stages such as within the receiver 200 of FIG. 2. In FIG. 3a, the time plot of an exemplary original or preprocessed pulse signal 325-1 is shown. The original or preprocessed pulse signal 325-1 shown in FIG. 3a may correspond to the original or delayed pulse signal 225 output by the time delay unit 220 shown in FIG. 2. In embodiments, the original or preprocessed pulse signal 325-1 may, for example, be a UWB pulse after a squaring operation. Advantageously, in the present receiver structure and built ranging platform, an original or preprocessed pulse signal (325-1; 225) representing a squared signal obtained after a squaring operation is to be integrated.

In FIGS. 3a; 3b; 3c; 3d, the vertical axis of a time plot represents a level (e.g. energy or power) of a processed signal, while the horizontal axis of a time plot represents the time, respectively. Here, the time may be defined with reference to a sampling clock signal having a sampling clock period $\Delta t_s$.

In particular, the original or preprocessed pulse signal 325-1 of FIG. 3a extends from a starting point 301 to an end point 303, wherein the starting and the end point 301, 303 may, for example, be defined with respect to or corresponding to two time adjacent clock events provided by the sampling clock signal 215.

Moreover, the original or preprocessed pulse signal 325-1 of FIG. 3a is essentially identical to the pulse signal 105 input to the time delay unit 220 of FIG. 2. This is because in case the original or preprocessed pulse signal is provided, the pulse signal 105 is directly fed to the output of the time delay unit 220 without application of a time delay to the same.

In FIG. 3b, a time plot of an exemplary delayed pulse signal 325-2 with a time delay $\Delta t_p$ is shown. The exemplary delayed pulse signal 325-2 shown in FIG. 3b may correspond to the original or delayed pulse signal 225 shown in FIG. 2. As depicted in FIG. 3b, the delayed pulse signal 325-2 essentially corresponds to a pulse signal or preprocessed signal 105, which has been delayed by the time delay $\Delta t_p$ using the time delay unit 220 of FIG. 2. It can be clearly seen in FIG. 3b that the time delay $\Delta t_p$ is smaller than half of the integration window $\Delta t_{int}$. Here, a size of the integration window $\Delta t_{int}$ may correspond to the sampling period $\Delta t_s$ defined by a time interval extending from the starting point 301 to the end point 303.

FIG. 3c shows two time plots of integration unit output signals 335-1, 335-2 based on the exemplary original (or preprocessed) or delayed pulse signal of FIG. 3a and FIG. 3b, respectively. Here, the integration unit output signals 335-1, 335-2 shown in FIG. 3c may correspond to the integration unit output signal 235 at the output of the integration unit 230 shown in FIG. 2.

Referring to FIGS. 3a; 3b; 3c, the time plot 335-1 of FIG. 3c may be obtained from an integration of the original or preprocessed pulse signal 325-1 of FIG. 3a, while the time plot 335-2 of FIG. 3c may be obtained from an integration of the delayed pulse signal 325-2 of FIG. 3b, respectively, wherein the integration is performed within the integration window $\Delta t_{int}$ corresponding to the sampling clock period $\Delta t_s$. It can be seen in FIG. 3c that the integration unit output signal 335-1, 335-2 may have a rising portion 337-1, 337-2 extending from a starting point 301 to a characteristic time $t_s$ and a trailing portion 339-1, 339-2 extending from the characteristic time $t_s$ to an end point 303 of the integration window $\Delta t_{int}$. The rising and trailing portions of the integrator unit output signal typically originate from an alternate switching between an integrating or activated state and a non-integrating or deactivated state of the integration unit. As shown in FIGS. 3a; 3b; 3c, the integration window for the original or preprocessed pulse signal 325-1 and the delayed pulse signal 325-2 extends at least partially from a starting point 301 to an integrator sampling point 305-1 ($P_{s1}$) and 305-2 ($P_{s2}$), respectively, wherein the integrator sampling points 305-1, 305-2 are changed by the time delay $\Delta t_p$ with respect to the corresponding pulse shape from the original or preprocessed pulse signal 325-1 to the delayed pulse signal 325-2. Therefore, as shown in FIG. 3c, the integration unit output signal 335-2 corresponding to the delayed pulse signal 325-2 will essentially be higher than the integration unit output signal 335-1 corresponding to the original or preprocessed pulse signal 325-1 over the whole integration window.

FIG. 3d shows two time plots of sampled integrator value signals 345-1, 345-2 based on the integration unit output signals of FIG. 3c. The sampled integrator value signals 345-1, 345-2 may be output by the sampling and hold device 240 of the receiver 200 shown in FIG. 2. In addition, the sampled integrator value signals 345-1, 345-2 of FIG. 3d may correspond to the sampled integrator value signal 245 of FIG. 2. Referring to FIG. 3c, the integration unit output signals 335-1, 335-2 may be sampled at the characteristic time $t_s$ corresponding to respective integrator sampling points 311-1, 311-2, wherein the integrator sampling points 311-1, 311-2 of FIG. 3c essentially correspond to the integrator sampling points 305-1, 305-2 of FIGS. 3a; 3b. Correspondingly, the sampled integrator value signals 345-1, 345-2 as shown in FIG. 3d may be obtained from sampling the integration unit output signals 335-1, 335-2 at the integrator sampling points 311-1, 311-2, respectively. The thus obtained sampled integrator value signals 345-1, 345-2 are typically not represented by single values in the time plots and may extend from a starting point 301 to an end point 303 within the sampling clock period $\Delta t_s$. This behavior is essentially due to a sampling and hold operation performed by a sampling and hold device such as the sampling and hold device 240 of FIG. 2. It can be seen from FIGS. 3c; 3d that because of the higher signal level of the integration unit output signal 335-2 as compared to that of the integration unit output signal 335-1, the sampled integrator value signals 345-1, 345-2 essentially have different levels. In particular, the sampled integrator value signal 345-2 is characterized by a relatively large value, while the sampled integrator value signal 345-1 is characterized by a relatively low value.

In embodiments, the characteristic time $t_s$ which characterizes the integrator sampling points may be chosen to be approximately located in the middle of the integration window $\Delta t_{int}$ or sampling clock period $\Delta t_s$, respectively, wherein the time $t_s$ is measured with respect to a starting point defined by an initial clock event (i.e. $t_s \approx \frac{1}{2} \cdot \Delta t_{int}$).

As a result of the previously described processing, the two sampled integrator value signals 345-1, 345-2 can essentially be used to distinguish between the corresponding original or preprocessed pulse signal 325-1 and the delayed pulse signal 325-2. According to further embodiments, this processing can be extended to a plurality of different sampled integrator value signals corresponding to different successively introduced time delays $\Delta t_p$. Here, it is to be noted that the successively introduced time delay $\Delta t_p$ is smaller than half of the integration window $\Delta t_{int}$ for each introducing the same.

Figure 4:
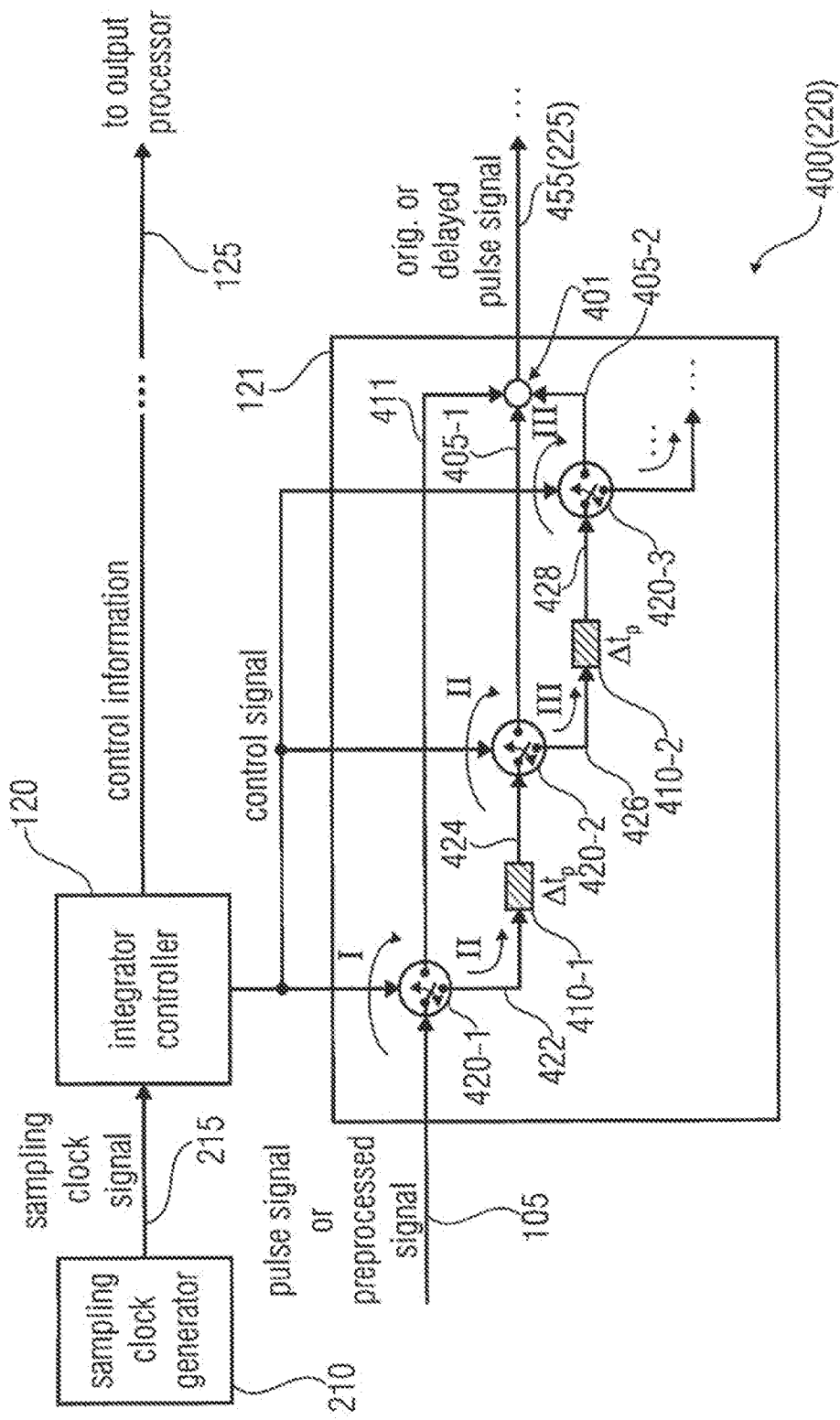
FIG. 4 shows a block diagram of an embodiment of a time delay unit using a control signal.

FIG. 4 shows a block diagram of an embodiment of a time delay unit 400 using a control signal. The time delay unit 400 of FIG. 4 may correspond to the time delay unit 220 of FIG. 2. The other identical blocks in FIG. 2 and FIG. 4 having similar implementations and/or functions are denoted by the same numerals. Specifically, the time delay unit 400 of FIG. 4 may comprise a plurality 401 of delay lines for successively processing the pulse signal 105 and for feeding the successively processed signal 405-1, 405-2, ..., to the output 455 of the time delay unit 400, respectively. Here, the output 455 of the time delay unit 400 may correspond to the output 225 of the time delay unit 220 for the original or delayed pulse signal. As shown in FIG. 4, the plurality 401 of delay lines comprises a changing number of individual delay line elements 410-1, 410-2, ..., wherein each individual delay line element 410-1, 410-2, ..., is configured to introduce a time delay $\Delta t_p$. It can also be seen in FIG. 4 that each individual delay line element 410-1, 410-2, ..., is connected with a switch output 422, 426 of a preconnected switch 420-1, 420-2 and a switch input 424, 428 of a post-connected switch 420-2, 420-3, respectively. In the FIG. 4 embodiment, the plurality of switches 420-1, 420-2, 420-3 is especially configured to perform a switching based on the control signal 121. The switching in particularly performed such that, for an initial sampling period I, the pulse signal 105 will directly be fed to the output 455 of the time delay unit 400, and for successive sampling periods II, III, ..., the pulse signal 105 will successively be processed by the plurality 401 of delay lines. In this way, the original or delayed pulse signal will be obtained at the output 455 of the time delay unit 400.

The special configuration of the time delay unit 400 ensures that in case of identical delay line elements 410-1, 410-2, ..., for example, the pulse signal 105 will successively be delayed by the time delay $\Delta t_p$ while passing the corresponding delay lines 405-1, 405-2, ..., respectively. By means of a controlled switching of the time delay unit 400 based on the control signal 121, it can also be ensured that the pulse signal 105 is not delayed within the initial sampling period I, while it is successively delayed and accumulating increasing time delays ($1 \cdot \Delta t_p$, $2 \cdot \Delta t_p$, ...) within the successive sampling periods II, III, ..., respectively. The controlled switching as indicated by the arrows showing the respective switching states of the switches 420-1, 420-1, 420-3 for the sampling periods I, II, III, ..., can especially be performed by using the integrator controller 120. Here, the integrator controller 120 may be configured to provide the control signal 121 based on the sampling clock signal 215 generated by the sampling clock generator 210. In the FIG. 4 embodiment, the switches 420-1, 420-2, 420-3 can be controlled so that the switching from an initial path 411 to the successive delay lines 405-1, 405-2, ..., respectively, will coincide with several successive pulses of the sequence of pulses constituting the pulse signal 105. Therefore, according to the embodiment of FIG. 4, an original pulse of the sequence of pulses will directly be fed to the output 455 of the time delay unit 400 without being delayed, a successive pulse of the sequence of pulses will be delayed by a time delay $\Delta t_p$, yet a successive pulse will be delayed by two times the time delay ($2 \cdot \Delta t_p$) etc.

According to further embodiments, the time delay $\Delta t_p$ of each delay line element 410-1, 410-2, ... may, for example, be set to a fraction $1/N \cdot \Delta t$ of the integration window $\Delta t_{int}$, wherein N corresponds to the number of the plurality 401 of delay lines or the successive pulses of the sequence of pulses, respectively, received by the time delay unit 400.

Figure 5:
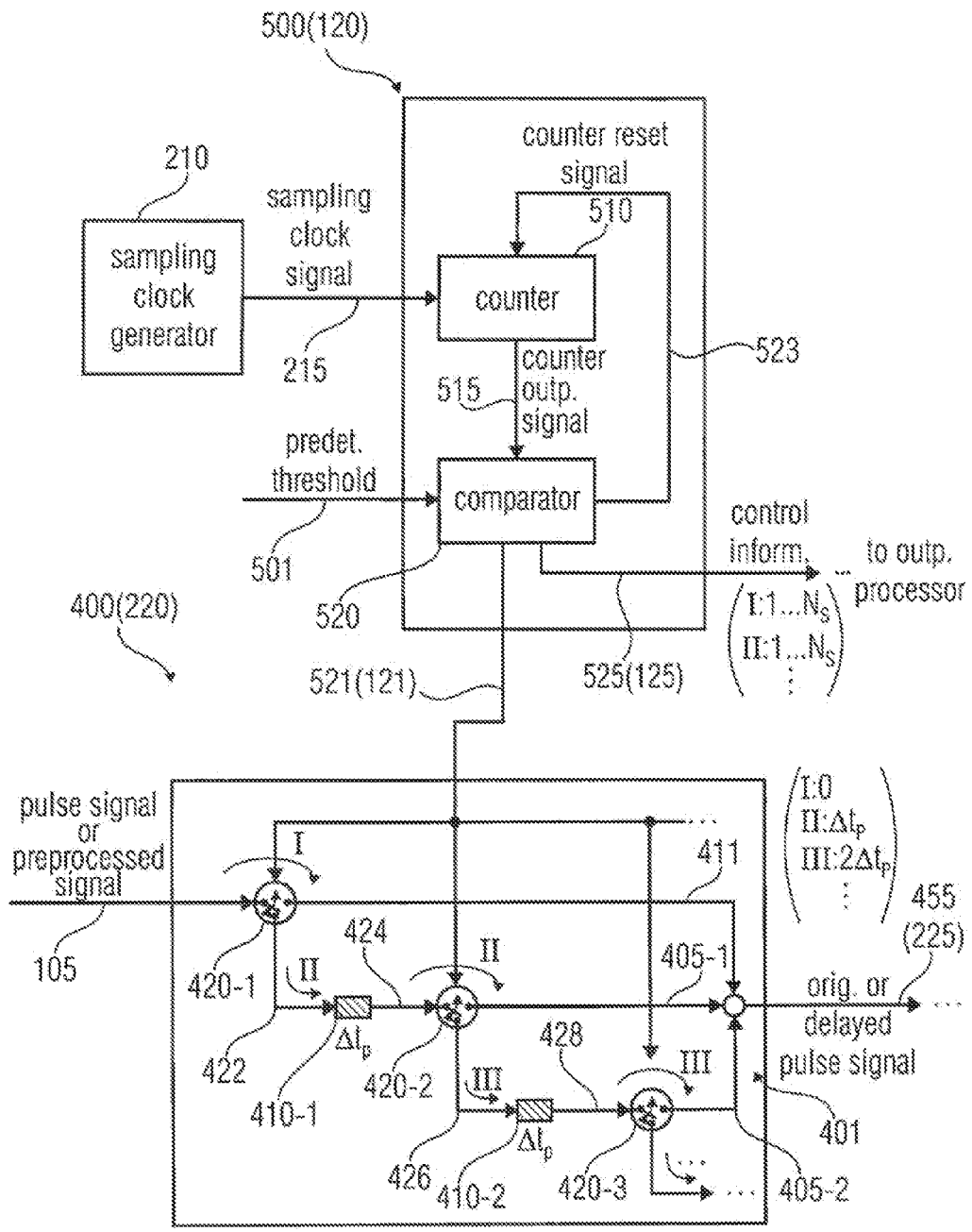
FIG. 5 shows a block diagram of an embodiment of an integrator controller with a comparator for providing a control signal and a control information to be used for an output processor of the receiver.

FIG. 5 shows a block diagram of a an embodiment of an integrator controller 500 with a comparator for providing a control signal and a control information for the output processor such as employed by the receiver 100 of FIG. 1. As shown in FIG. 5, the integrator controller 500 may comprise a counter 510 for counting pulses of a sampling clock signal 215 to obtain a counter output signal 515. The integrator controller 500 may furthermore comprise a comparator 520 which is configured to provide a control signal 521 for the integrator 110. The control signal 521 shown in FIG. 5 essentially corresponds to the control signal 121 of the receiver 100 shown in FIG. 1. In particular, the control signal 521 can be based on a comparison of a counter output signal 515 with a predetermined threshold 501. The comparator 520 is also configured to provide a counter reset signal 523 for resetting the counter 510 when the predetermined threshold 501 is reached. Here, the predetermined threshold 501 may, for example, be reached for each $N_s$th pulse of the sampling clock signal 215. The integrator 110 such as shown in the FIG. 1 embodiment can be controlled by the control signal 521, so that the time delay $\Delta t_p$ will be introduced for each $(N_s+1)$th pulse of the sampling clock signal 215. The comparator 520 of FIG. 5 is furthermore configured to generate a control information 525, which may correspond to the control information 125 as shown in FIG. 1, wherein the control information 525 indicates different delays to be used for the output processor 130. Here, the different delays are obtained from successively introducing the time delay $\Delta t_p$, respectively.

According to further embodiments, the comparator 520 of the integrator controller 500 may provide the control signal 521 especially for the time delay unit comprising the plurality 401 of delay lines. As shown in FIG. 5, the control signal 521 may be supplied to the plurality of switches 420-1, 420-2, 420-3 which are controlled so that the original or delayed pulse signal 455 will be obtained for the initial sampling period I and the successive sampling periods II, III, . . . , respectively. As a result, no time delay (delay line 411) or accumulated different time delays $(1 \cdot \Delta t_p, 2 \cdot \Delta t_p, \ldots)$ will successively be introduced by the plurality 401 of delay lines. This has been described correspondingly before. Here, the switching is particularly determined by the sampling periods I, II, III, . . . , wherein each sampling period I, II, III, . . . , corresponds to a number $N_s$ of consecutive pulses indicated by 1, 2, . . . , $N_s$ of the sampling clock signal 215. The thus defined sampling periods I: 1, 2, . . . , $N_s$; II: 1, 2, . . . , $N_s$; . . . are obtained because of the threshold condition (arrow 501) used by the comparator 520. Simultaneously, the control information 525 is also provided by the comparator 520 of the integrator controller 500. In particular, the control information 525 may comprise an indication of the absence of a time delay for the initial sampling period (I: 1, 2, . . . , $N_s$) or the accumulated different delays $(1 \cdot \Delta t_p, 2 \cdot \Delta t_p, \ldots)$ for the successive sampling periods (II: 1, 2, . . . , $N_s$, III: 1, 2, . . . , $N_s$, . . . ), respectively. This control information may subsequently be used by the output processor for generating a time measure.

According to further embodiments, the integrator 250 may comprise an integration unit 230 for integrating an original or delayed pulse signal 225 in an integration window $\Delta t_{int}$, wherein the integrator 250 is particularly configured to perform the following steps. First, the starting point $t_0$ of the integration window $\Delta t_{int}$ is determined dependent on a sampling clock event. Then, an integrator value is sampled at the integrator sampling point $t_s$ a time period later than the starting point $t_0$. Here, the time period is smaller than a sampling clock period $t_s$. Finally, the integrator 250 is reset subsequent to the sampling point $t_s$.

Figure 6:
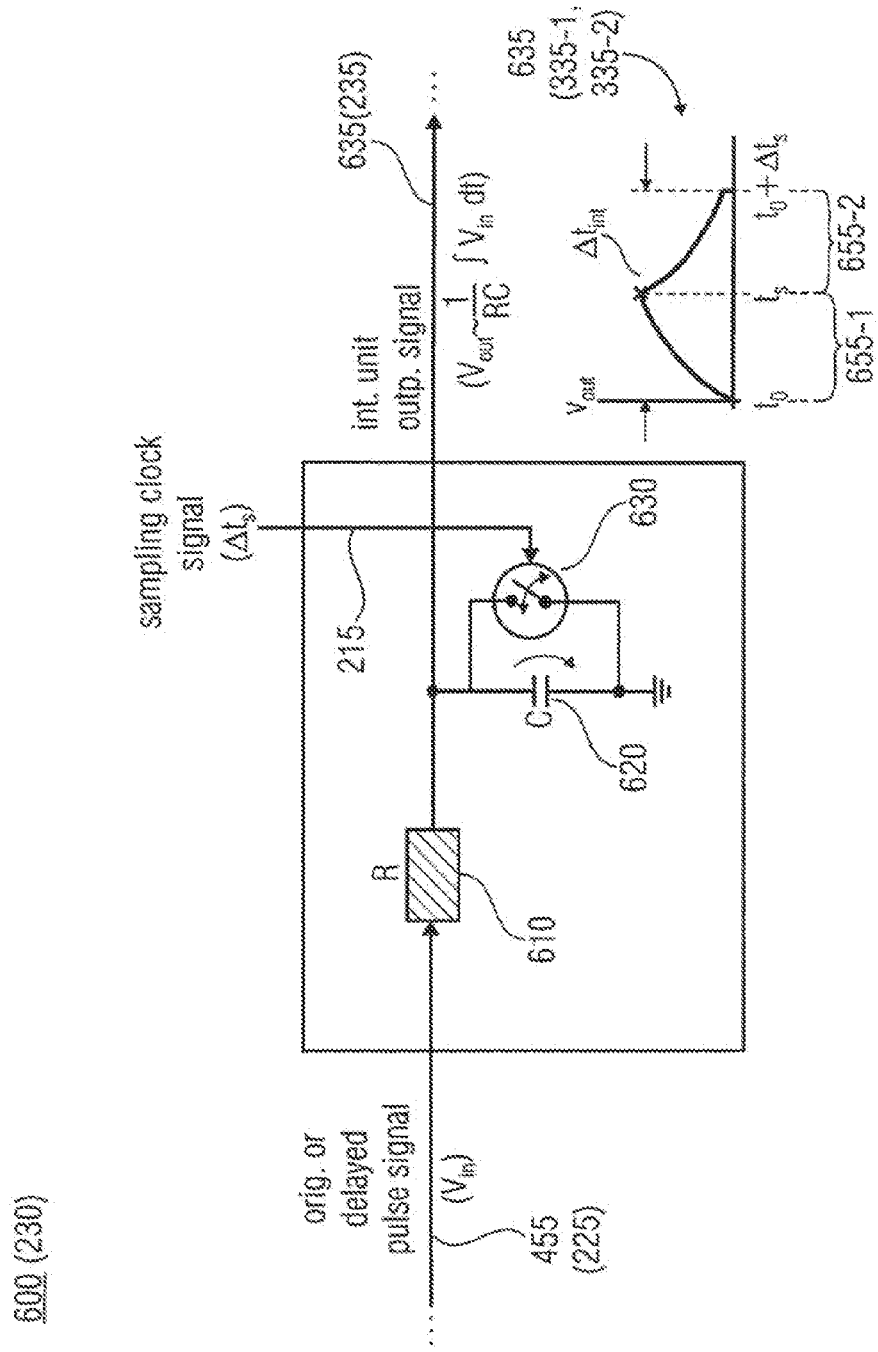
FIG. 6 shows a block diagram of an embodiment of a resistor capacitor (RC) integration unit with a switch.

FIG. 6 shows a block diagram of an embodiment of a resister capacitor (RC) integration unit 600 with a switch. As shown in FIG. 6, the resistor capacitor integration unit 600, which may correspond to the integration unit 230 of FIG. 2, comprises a switch 630, wherein the switch 630 is configured to switch between an integrating and a non-integrating state of the integration unit 600 with respect to a sampling clock period $\Delta t_s$. In particular, the RC integration unit 600 may consist of a resistor 610 denoted by 'R' and a capacitor 620 denoted by 'C' which are connected in such a way that an incoming signal (e.g. input voltage signal $V_{in}$) will be integrated over a certain period and subsequently output as an integrated signal 635 (e.g. output signal $$V_{out} \sim \frac{1}{RC} \int V_{in} dt \Bigg).$$

Here, the incoming signal of the RC integration unit 600 may correspond to the original or delayed pulse signal 455 (225) provided by the time delay unit 400 of FIG. 4 or the time delay unit 220 of FIG. 2, respectively, while the output signal 635 may correspond to the integration unit output signal 235 of FIG. 2. As shown in FIG. 6, the switch 630 of the RC integration unit 600 can be controlled by a sampling clock signal such as the sampling clock signal 215 generated by the sampling clock generator 210 of FIG. 2, wherein an open state of the switch 630 may correspond to the integrating state, while a closed state of the switch 630 may correspond to the non-integrating state.

In FIG. 6, a time plot of an exemplary integration unit output signal 635, which may correspond to the integration unit output signal 335-1 or 335-2, respectively, is also shown. It can be seen in the time plot of FIG. 6 that in the integrating state of the switch 630, a level of the integration unit output signal 635 increases corresponding to a charging of the capacitor 620, while in the non-integrating state of the switch, the level of the integration unit output signal 635 decreases corresponding to a discharging of the capacitor 630. Here, the time period 655-1, 655-2 for the integrating state and the non-integrating state, respectively, may be controlled by the switch 630 so that the time period 655-1 will extend from an initial sampling clock event $t_0$ to an integrator sampling time $t_s$, while the time period 655-2 will extend from the integrator sampling time $t_s$ to a consecutive sampling clock event $t_0+\Delta t_s$, wherein $\Delta t_s$ is the sampling clock period as provided by the sampling clock signal 215. Here, the integration window $\Delta t_{int}$ may be defined by the two time adjacent clock events $t_0$ and $t_0+\Delta t_s$.

In embodiments, the integrator (250) may comprise a sampling and hold device (240) for sampling an integration unit output signal (235). Specifically, the sampling and hold device (240) may be configured for generating the sampled integrator value signal (245) by sampling the integration unit output signal (235) at the integrator sampling point ($t_s$).

Figure 7:
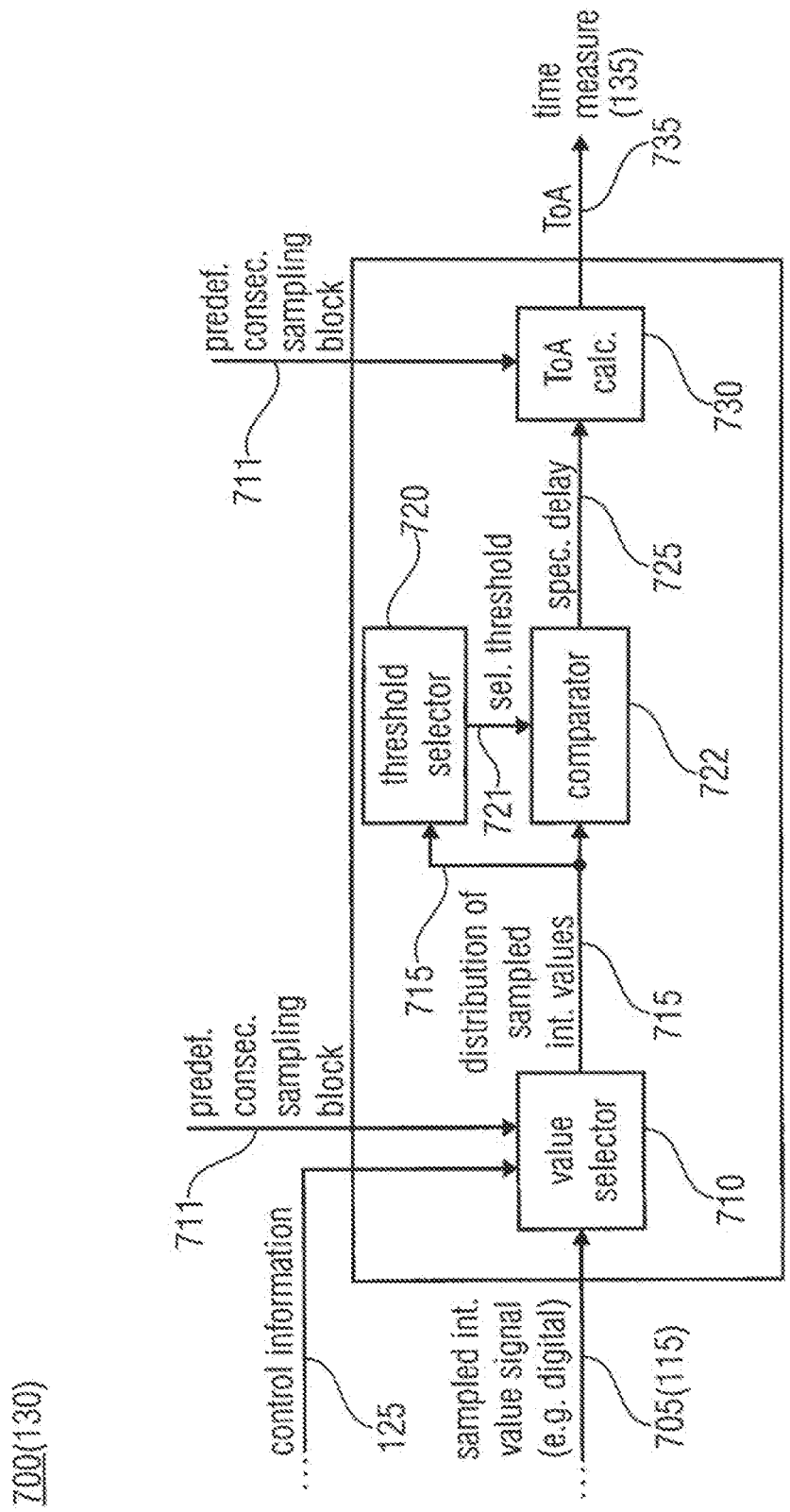
FIG. 7 shows a block diagram of an embodiment of an output processor of the receiver with a threshold selector and a time of arrival calculator.

FIG. 7 shows a block diagram of an embodiment of an output processor with a threshold selector and a time of arrival calculator. The output processor 700 shown in FIG. 7 may correspond to the output processor 130 of the receiver 100 shown in FIG. 1. In particular, the output processor 700 may comprise a value selector 710, the threshold selector 720, a comparator 722 and a time of arrival (ToA) calculator 730. As shown in FIG. 7, the output processor 700 is configured to receive a sampled integrator value signal 705, which may correspond to the sampled integrator value signal 115 provided by the integrator 110 of FIG. 1. In embodiments, the sampled integrator value signal 705 may, for example, be a digital signal having been obtained after an analog-to-digital conversion of an analog sampled integrator value signal. The value selector 710 of the output processor 700 may be configured for selecting a plurality of sampled integrator values for a predefined consecutive sampling block 711 and for relating the selected sampled integrator values to corresponding delays indicated by a control information 125 from the integrator controller 120. In this way, the distribution 715 of sampled integrator values will be obtained at the output of the value selector 710. Here, the predefined consecutive sampling block 711 may, for example, be defined by a sampling clock period $\Delta t_s$ having a same indication within different successive sampling periods. In other words, the predefined consecutive sampling block 711 may correspond to a specific time period extending between two repeated time adjacent clock events for different successive sampling periods, wherein the predefined consecutive sampling block 711 can, for example, be the ith consecutive sampling block corresponding to the ith sampling clock event of the initial sampling period I, a successive sampling period II, etc.

Therefore, the distribution 715 of sampled integrator values may comprise the selected sampled integrator values of the ith consecutive sampling block related to the corresponding accumulated time delay ($1 \cdot \Delta t_p$, $2 \cdot \Delta t_p$, . . . ) obtained after the successive time delay operation as described in detail before. Subsequently, the threshold selector 720 may be operative on the distribution 715 of sampled integrator values to obtain a selected threshold 721.

Here, the threshold selection performed by the threshold selector 720 may be based on a statistical analysis, or more specifically, on a probability characteristic of the distribution 715 of sampled integrator values such as a kurtosis estimate of the same. The comparator 722 of the output processor 700 may be configured for determining a specific delay 725 for which a sampled integrator value exceeds the selected threshold 721. In particular, the specific delay 725 can be determined based on a comparison of the distribution 715 of sampled integrator values with the selected threshold 721. Finally, the time of arrival (ToA) calculator 730 may be configured for calculating a time of arrival 735 of the pulse signal based on the determined specific delay 725. Here, the calculation of the ToA 735 performed by the ToA calculator 730 may be based on the information about the predefined consecutive sampling block 711, wherein the ToA can be calculated with respect to a specific clock event corresponding to the ith consecutive sampling block. If, for example, the ith consecutive sampling block has a frame border at 7 ns, while a determined specific delay corresponding to $3 \cdot \Delta t_p$ is obtained, the ToA will be estimated to be approximately 7.3 ns. The estimated ToA can then be used to estimate a corresponding time measure 135.

Figure 8:
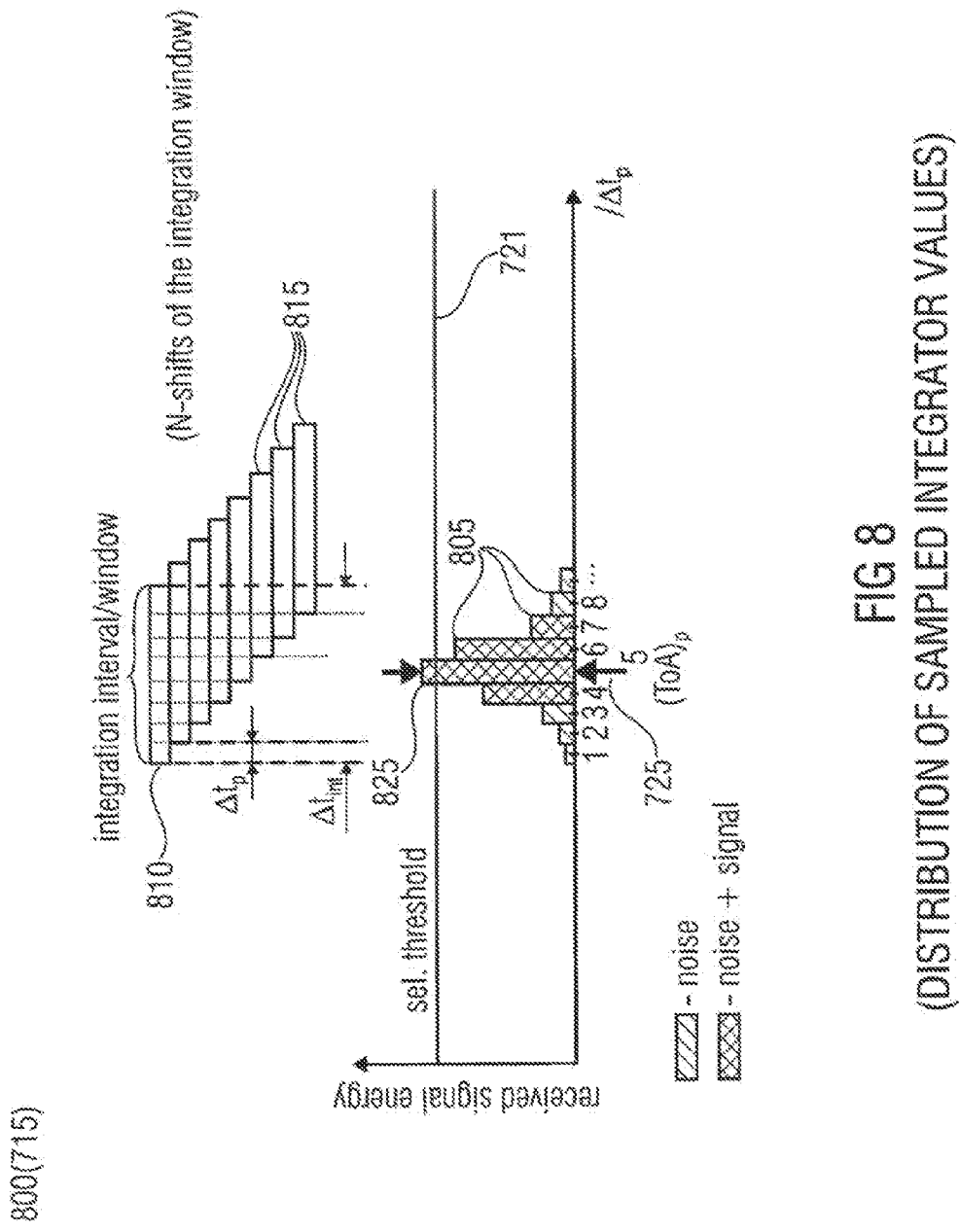
FIG. 8 shows a graph of an exemplary distribution of sampled integrator values processed by the output processor in accordance with FIG. 7.

FIG. 8 shows a graph of an exemplary distribution 800 of sampled integrator values, which may correspond to the distribution 715 as processed by the output processor in accordance with FIG. 7. In FIG. 8, selected sampled integrator values 805 of the distribution 800 are depicted versus the corresponding delays in units of $\Delta t_p$. Here, the vertical axis of the distribution represents the received signal energy, while the horizontal axis of the distribution represents an indication indicating a current 810 and later integration windows 815. As shown in FIG. 8, the current and the later integration windows 810, 815 are separated from each other by the time delay $\Delta t_p$, respectively, wherein the time delay $\Delta t_p$ is exemplarily set to 1/Nth of the integration window $\Delta t_{int}$, so that N shifts of the integration window or successively introduced time delays will result in an overall shift being equal to the integration window $\Delta t_{int}$. In the example of FIG. 8, the time delay $\Delta t_p$ corresponds to $1/8^{th}$ of the integration window. It can be clearly seen in FIG. 8 that the specific delay 725 for which a sampled integrator value 825 exceeds the selected threshold 721 corresponds to the indication "5" representing the ToA of the pulse (ToA$_p$) to be used for the time measure 135. The indication "5" in the example of FIG. 8 indicates that the fifth later integration window corresponding to an accumulated delay of $5 \cdot \Delta t_p$ has a sampled integrator value exceeding the threshold, thereby identifying the time of arrival of the pulse with respect to the current integration window.

Figure 9:
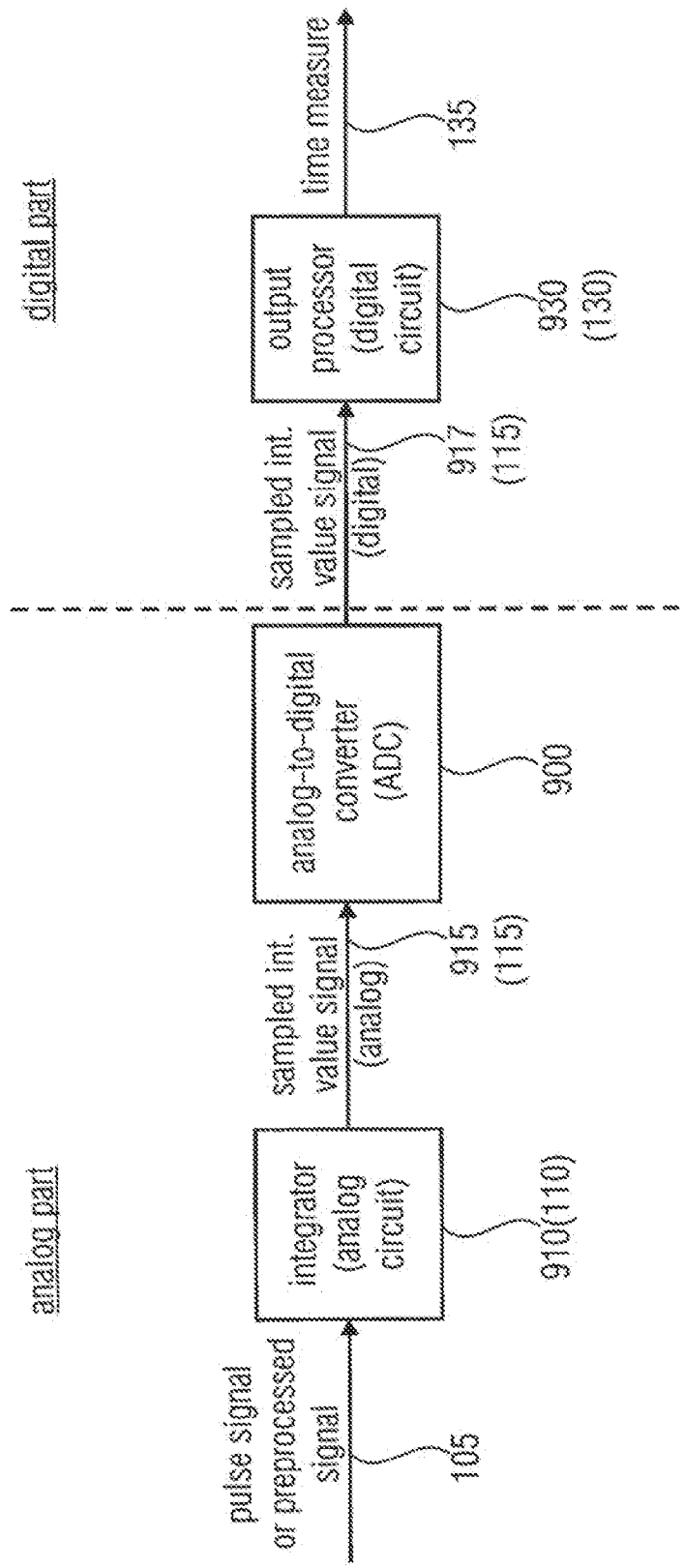
FIG. 9 shows a block diagram of an embodiment of an analog-to-digital converter (ADC) placed between an integrator and an output processor of the receiver.

FIG. 9 shows a block diagram of an embodiment of an analog-to-digital converter 900 (ADC) placed between an integrator and an output processor. As shown in FIG. 9, the analog-to-digital converter 900 (ADC) may be configured for converting an analog signal 915 output by the integrator 110 into a digital signal 917 for the output processor 130. Here, the analog signal 915 and the digital signal 917 may correspond to the sampled integrator value signal 115 as shown in the FIG. 1 embodiment. Referring to FIG. 9, the integrator 110 is especially configured as an analog circuit 910, while the output processor 130 is especially configured as a digital circuit 930. The integrator 910 and the output processor 930 as shown in FIG. 9 may correspond to the integrator 110 and the output processor 130 as shown in FIG. 1. The analog-to-digital converter 900 essentially represents an interface between the analog part and the digital part of a receiver.

Figure 10:
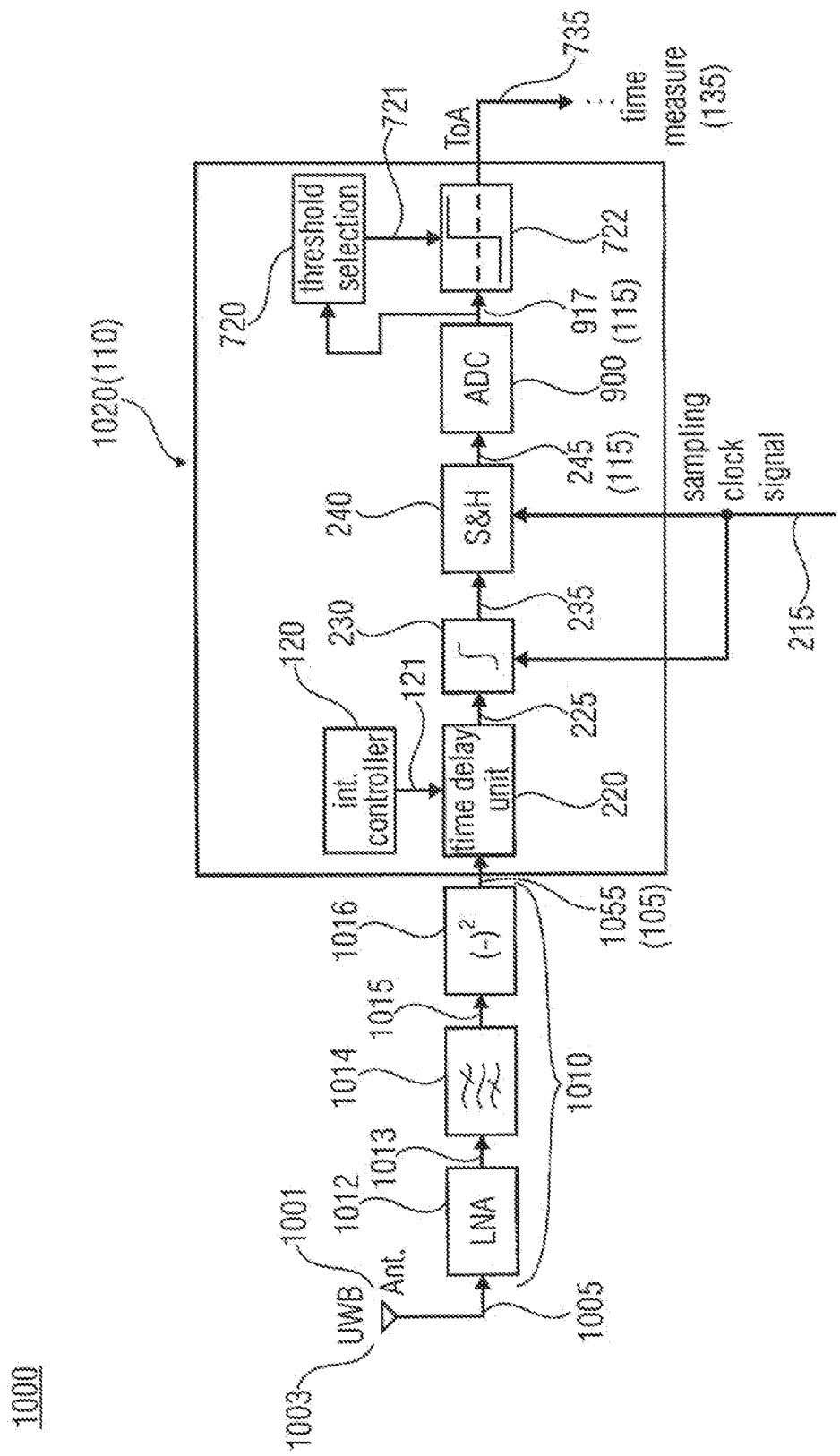
FIG. 10 shows a block diagram of a further embodiment of the receiver for determining a time measure depending on a time of arrival of a pulse signal derived from a UWB signal.

FIG. 10 shows a block diagram of a further embodiment of a receiver 1000 for determining a time measure depending on a time of arrival of a pulse signal. As can be seen in FIG. 10, the receiver 1000 comprises a preprocessing unit 1010 and an integrator 1020, which may correspond to the integrator 110 with the variable and controllable integration window as shown in FIG. 1. The integrator 1020 essentially comprises the same blocks as has been described in the previous embodiments. Therefore, identical blocks having similar implementations and/or functions are denoted by the same numerals. Moreover, the preprocessing unit 1010 may be configured for preprocessing a raw signal 1005 output by an antenna 1001. Here, the antenna 1001 can be used for receiving a UWB signal from a transmitter and to generate the raw signal 1005. In the FIG. 10 embodiment, the preprocessing unit 1010 comprises a low noise amplifier 1012 (LNA), a filter 1014 and a squaring device 1016. After a preprocessing by the preprocessing unit 1010, an output signal 1055 will be obtained. Here, the output signal 1055 provided by the preprocessing unit 1010 may correspond to the pulse signal or preprocessed signal 105 to be used by the integrator 1020. The processing blocks of the preprocessing unit 1010 may work in the following way. The LNA 1012 is configured to amplify the raw signal 1005 to obtain an amplified signal 1013. The filter 1014 is configured to be operative on the amplified signal 1013 to generate a filtered signal 1015. Here, the filtered signal 1015 may be obtained by applying a bandpass filter to the amplified signal 1013. The squaring device 1016 is configured to perform a squaring operation of the filtered signal 1015 to obtain a squared signal 1055 as an input for the integrator 1020. Subsequently, the integrator 1020 is operative on the squared signal 1055 to determine the ToA 735 of the pulse signal as described in detail before.

Figure 11:
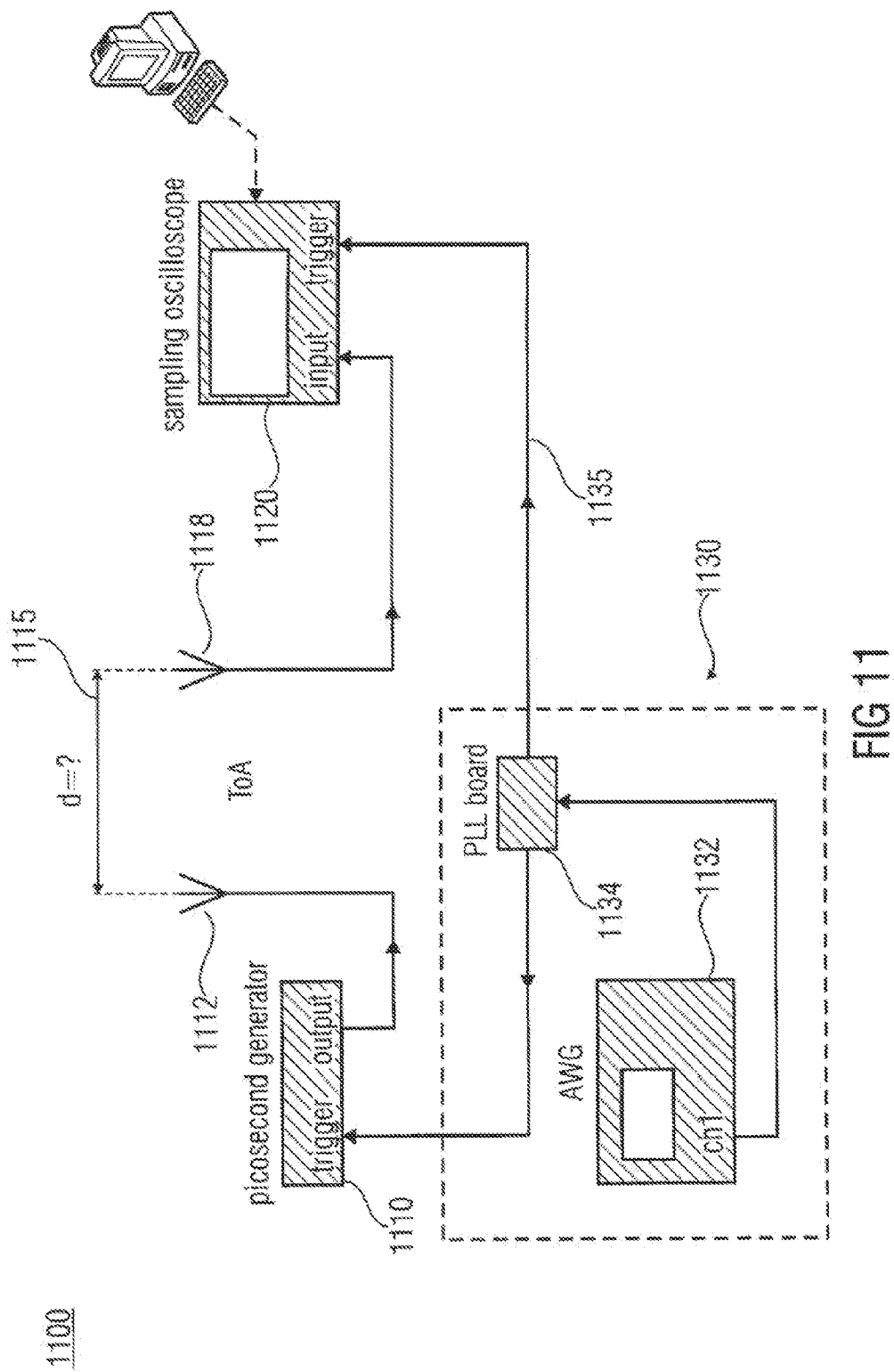
FIG. 11 shows a schematic illustration of an exemplary UWB ranging system according to an embodiment of the present invention.

FIG. 11 shows a schematic illustration of an exemplary UWB ranging system 1100 according to another embodiment of the present invention. In the example of a UWB ranging system as shown in the FIG. 11 embodiment, a developed UWB ranging platform may consist of a transmitter 1110, a receiver 1120, and a trigger unit 1130. In particular, a high level block diagram of the platform is shown in FIG. 11. As a transmitter 1110, a Picosecond 3500D Pulse generator is used. It is able to produce an ultra short pulse of a full width of 65 ps at half the maximum (fwhm) and of an amplitude of 8 V that is repeated with the repetition rate of 0.5 MHz. The trigger unit 1130 that provides the time synchronization signal between the transmitter 1110 and the receiver 1120, consists of a Tektronix AWG 7122B Arbitrary Waveform Generator 1132 and an Analog Devices AD9516 PLL evaluation board 1134 that adjusts the trigger signal 1135 in frequency and amplitude as may be done for the Picosecond generator 1110 and the oscilloscope 1120. As receiver 1120, a LeCroy WE100H 30 GS/s sampling oscilloscope is used. The unknown distance 1115 between the two UWB SMT-3TO10M-A SkyCross antennas 1112, 1118 operating in the 3-10 GHz band is determined by means of a ToA method that is based on measuring the propagation time. The two UWB antennas 1112, 1118 are mounted on a rail guide allowing for distance change and are connected to the measurement equipment via high quality Sucoflex 104PE cables. These cables have the S21 parameter for frequencies <12 GHz being better than −1.1 dB and −1.7 dB for 1 m and 1.5 m cable length, respectively. All signal processing operations at the receiver side, i.e., signal squaring, integration, and A/D conversion, threshold selection, and distance calculation are performed by a Visual Basic application operating in real-time on the sampling oscilloscope 1120. Visual Basic support is one of the custom features of LeCroy oscilloscopes that allows to create and deploy a measurement or algorithm directly on the oscilloscope in real-time. To give a user the possibility to control the platform parameters including the integration window size which is reciprocal to the sampling rate, resolution of the ADC given in number of bits, average range, real and calibration distance, and visualization modus, a graphical user interface (GUI) has been developed and implemented. One of the important features that has been realized, is the calibration procedure during which cable propagation offsets are being determined provided the calibration distance is known. The estimated distance together with the error can be shown in real-time on the implemented GUI.

FIGS. 12a; 12b; 12c; 12d; 12e show time plots of different exemplary signals employed by the previous embodiments and related to the UWB ranging system 1100 of FIG. 11. In FIG. 12a, a time plot of an exemplary sampling clock signal 1200 from a sampling clock generator is shown. The individual sampling pulses of sampling clock events of the sampling clock signal 1200 may be indicated by "1", "2", "3", "4", . . . , "$N_s$" within an initial sampling period I: 1 . . . N, and the successive sampling periods II: 1 . . . $N_s$, III: 1 . . . $N_s$, . . . , respectively. As depicted in FIG. 12a, the time period between two time adjacent clock events (e.g. "1" and "2") is referred to as the sampling clock period $\Delta t_s$, wherein the individual pulses of the sampling clock signal 1200 may be equally spaced. The sampling period $\Delta t_s$ may, for example, be in the range of 1 ns corresponding to a typical sampling frequency $f_s$ of about 1 GS/s ($\Delta t_s=1/f_s$) such as provided by a sampling clock generator.

In FIG. 12b, a time plot of an exemplary transmitted pulse signal 1220 indicated by "T" having a sequence of pulses is shown. As depicted in FIG. 12b, the individual pulses 1222, 1224, 1226 of the sequence of pulses also referred to as 'pulse repetitions' may be equally spaced with respect to each other having a repetition time period $\Delta t_{rep}$. The repetition time period $\Delta t_{rep}$ may, for example, be in the range of 1 μs corresponding to a repetition rate $f_{rep}$ of the transmitted pulse signal 1220 of about 1 MHz ($\Delta t_{rep}=1/f_{rep}$). This means that the individual pulses 1222, 1224, 1226 may be repeated for each ($N_s+1$)th pulse of the sampling clock signal 1200 (i.e. approximately for each 1001th pulse in the above example).

Figure 12:
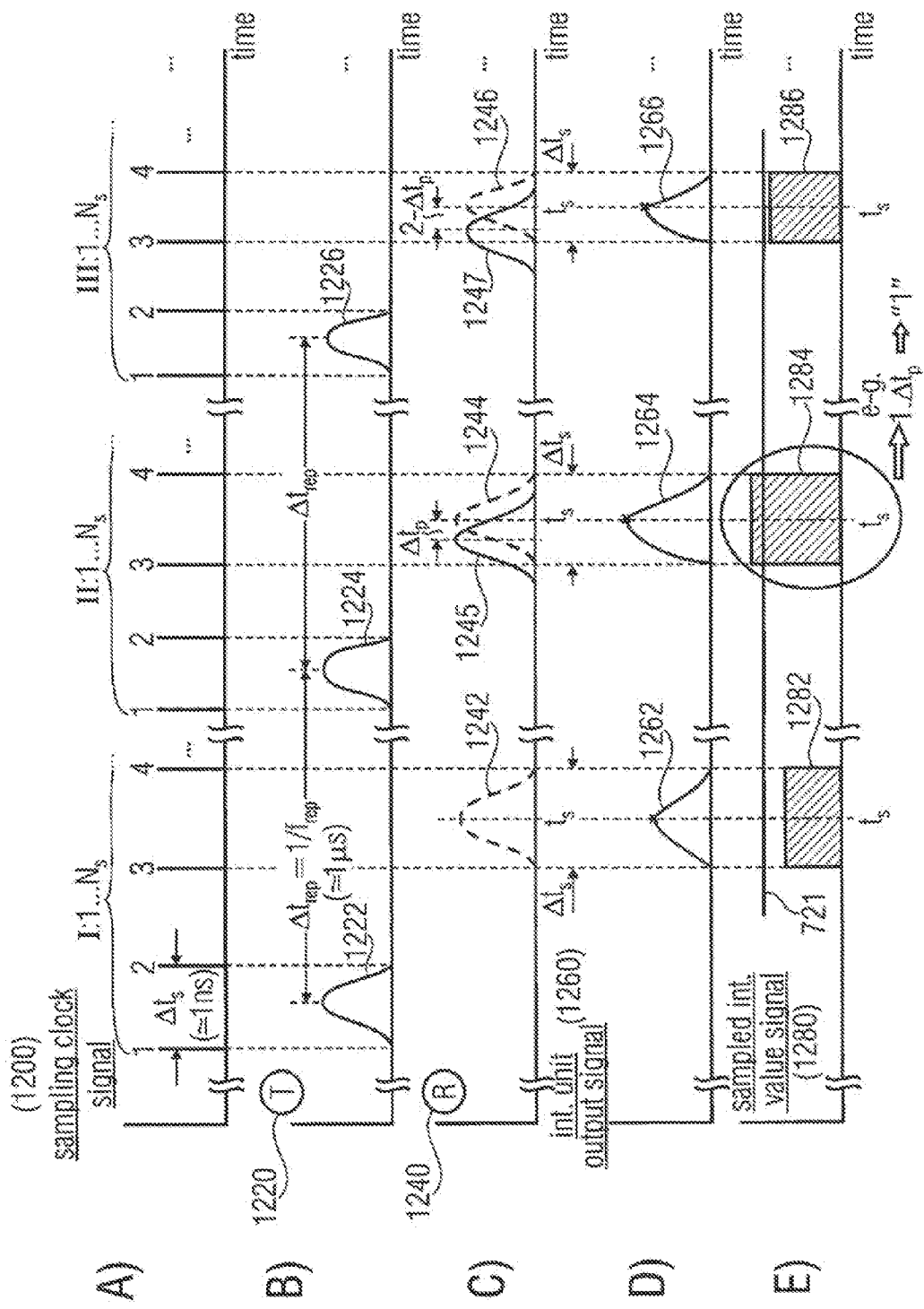
FIG. 12a shows a time plot of an exemplary sampling clock signal from a sampling clock generator.
FIG. 12b shows a time plot of an exemplary transmitted pulse signal having a sequence of pulses.
FIG. 12c shows a time plot of an exemplary received pulse signal having been delayed by increasing time delays over several successive pulses.
FIG. 12d shows a time plot of an exemplary integration unit output signal based on the exemplary received pulse signal of FIG. 12c.
FIG. 12e shows a time plot of an exemplary sampled integrator value signal based on the exemplary integration unit output signal of FIG. 12d.

FIG. 12c shows a time plot of an exemplary received pulse signal 1240 indicated by "R" having been delayed by increasing time delays over several successive pulses. Referring to FIGS. 12b and 12c, the exemplary received pulse signal 1240 of FIG. 12c is time delayed or shifted with respect to the exemplary transmitted pulse signal 1220 of FIG. 12b. Here, the time delay between the transmitted and the received pulse signal essentially corresponds to a propagation time or the ToA of the pulse signal propagating between a transmitter and a receiver. In FIG. 12c, the individual time delayed pulses 1242, 1244, 1246 of the exemplary received pulse signal 1240 are indicated by dotted lines. With reference to the example of FIG. 12, it can be assumed that the transmitter and the receiver are well synchronized at least within a relevant analysis time (e.g. about 10 μs), or for a sufficiently large number of pulse repetitions (e.g. up to 10 pulse repetitions).

As exemplarily shown in FIG. 12c, the received pulse signal 1240 essentially comprises a plurality of successively delayed pulses 1245, 1247, . . . , which have been furthermore delayed by increasing time delays ($1 \cdot \Delta t_p$, $2 \cdot \Delta t_p$, . . . ) with respect to the corresponding time delayed pulses 1244, 1246, . . . . of the received pulse signal 1240.

FIG. 12d shows a time plot of an exemplary integration unit output signal 1260 based on the exemplary received pulse signal of FIG. 12c. The individual signals 1262, 1264, 1266 . . . of the integration unit output signal 1260 may be obtained by integrating the individual signals 1242, 1245, 1247, respectively, as described in the previous embodiments. It can be seen in FIG. 12d that the individual signal 1264 has a larger value than the timely preceding or timely succeeding individual signals 1262, 1266.

FIG. 12e shows a time plot of an exemplary sampled integrator value signal 1280 based on the exemplary integration unit output signal of FIG. 12d. As shown in FIG. 12e, the sampled integrator value 1284 exceeds a selected threshold 721, while the timely adjacent sampled integrator values 1282, 1286 are below the threshold 721. In the example of FIG. 12, the specific delay for which the sampled integrator value 1284 exceeds the threshold 721 is $1 \cdot \Delta t_p$ corresponding to the indication "1". In the FIG. 12 example, the indication "1" obtained by comparing the sampled integrator values for the third consecutive block of the sampling clock periods I, II, III, . . . with the threshold, would correspond to a ToA of approximately 2.1 ns.

Figure 13:
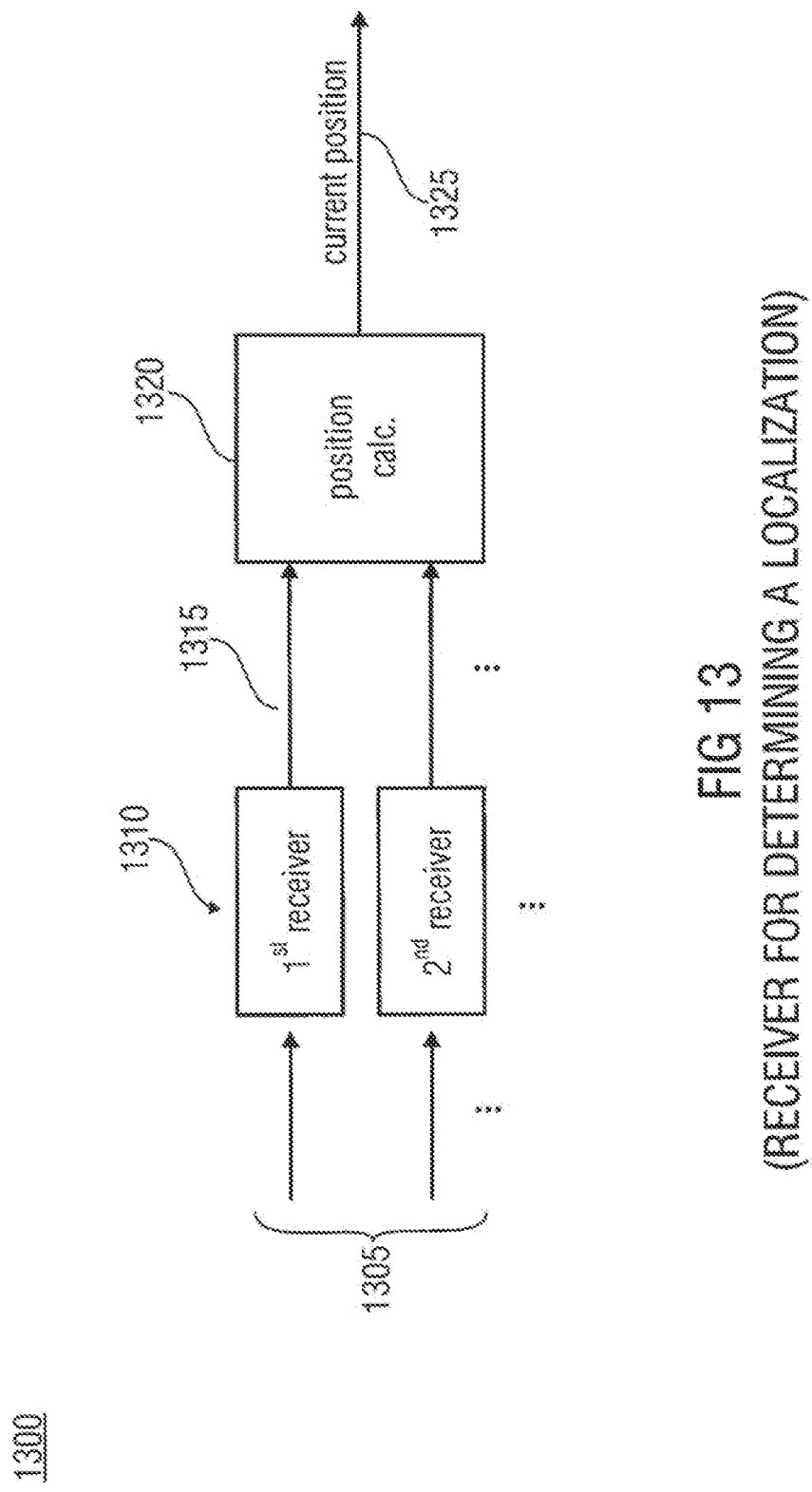
FIG. 13 shows a schematic illustration of a further embodiment of a receiver for determining a localization of the same.

FIG. 13 shows a schematic illustration of a further embodiment of a receiver 1300 for determining a localization of the same. In the FIG. 13 embodiment, the receiver 1300 may comprise a plurality 1310 of inventive receivers a position calculator 1320. The plurality 1310 of inventive receivers may be configured for determining at least two different ToAs 1315 of pulse signals 1305 each having a sequence of pulses from a plurality of transmitters. Moreover, the position calculator 1320 may be configured for calculating a current position 1325 of the receiver 1300 depending on the at least two different ToAs 1315. The calculation of the current position 1325 by the position calculator 1320 may, for example, be performed with a localization or triangulation procedure, which is based on the positions of the plurality of transmitters and respective radial distance information depending on the at least two different ToAs.

Figure 14:
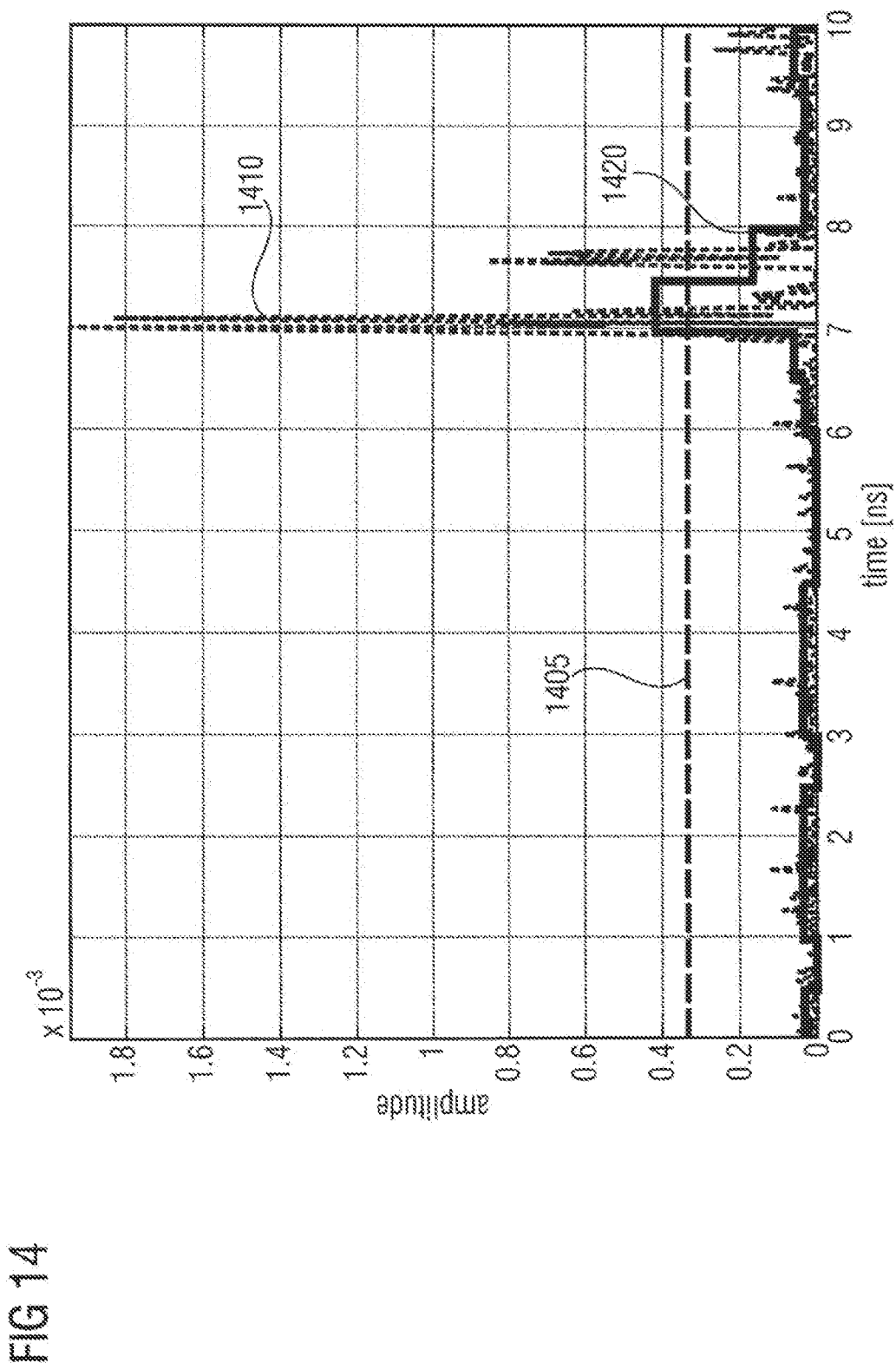
FIG. 14 shows time plots of exemplary real measured squared and integrated signals with a threshold according to conventional technology.

FIG. 14 shows time plots of an exemplary real measured squared 1410 and integrated signals 1420 with a threshold 1405 such as obtained with the UWB ranging system of FIG. 11. Here, the integration and sampling operation has been performed according to conventional technology with an exemplary sampling rate of 2 GS/s corresponding to a sampling clock period of 0.5 ns (see signal 1420 after the integration).

Figure 15:
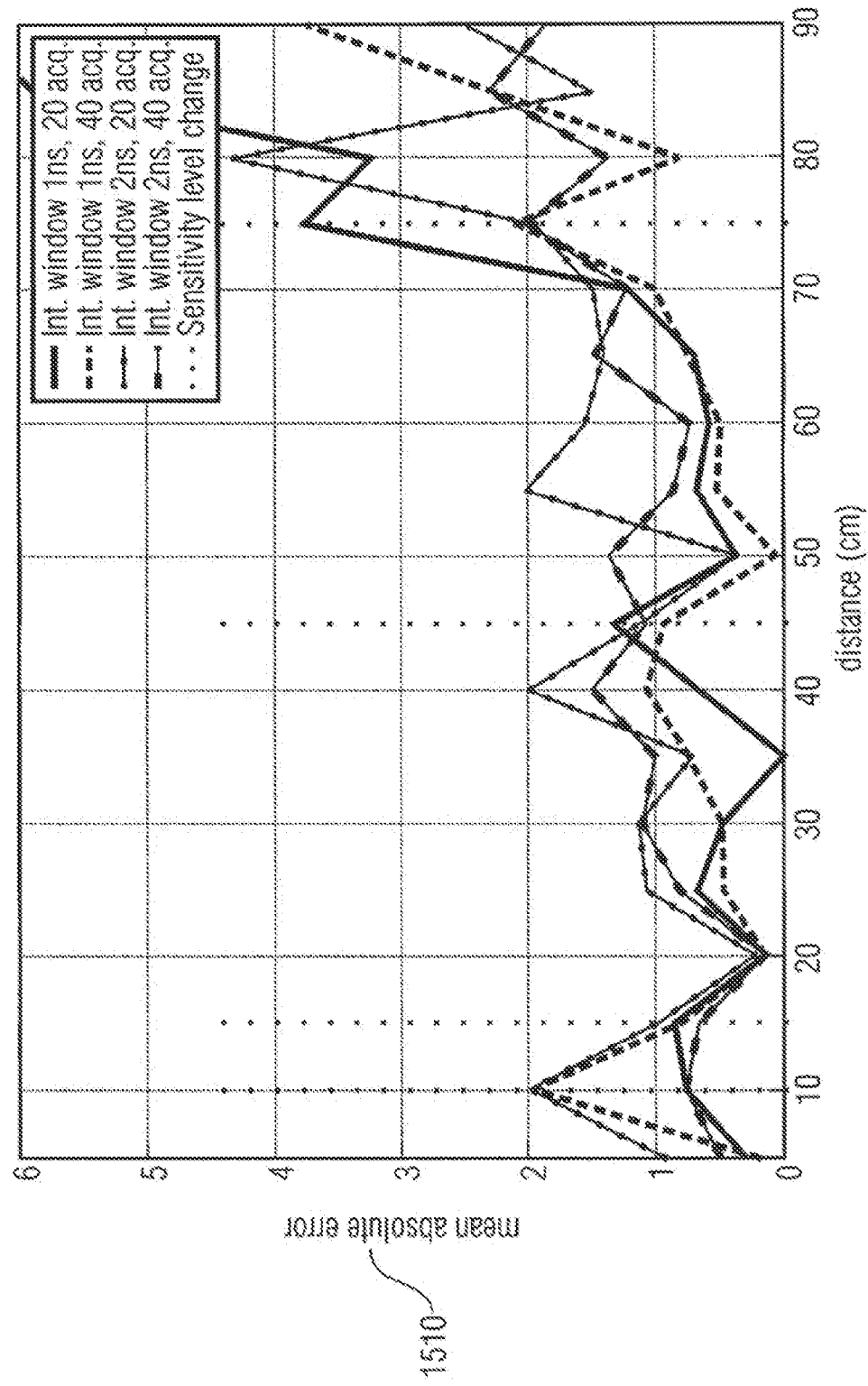
FIG. 15 shows a graph of an exemplary mean absolute error (MAE), illustrating a performance of the exemplary UWB ranging system of FIG. 11 according to an embodiment of the present invention.

FIG. 15 shows a graph of an exemplary mean absolute error (MAE), illustrating a performance of the exemplary UWB ranging system of FIG. 11 according to an embodiment of the present invention. The performance of such an inventive ranging system in terms of the mean absolute error (MAE) is presented in FIG. 15. As can be seen in FIG. 15, the MAE 1510 is in the centimeter range for integration window sizes of 1 ns and 2 ns, which corresponds to sampling rates of 1 GS/s and 500 MS/s, respectively. In particular, the mean absolute error (MAE) 1510 is shown in FIG. 15 for the integration window sizes of 1 and 2 ns with 20 and 40 acquisitions.

Figure 16:
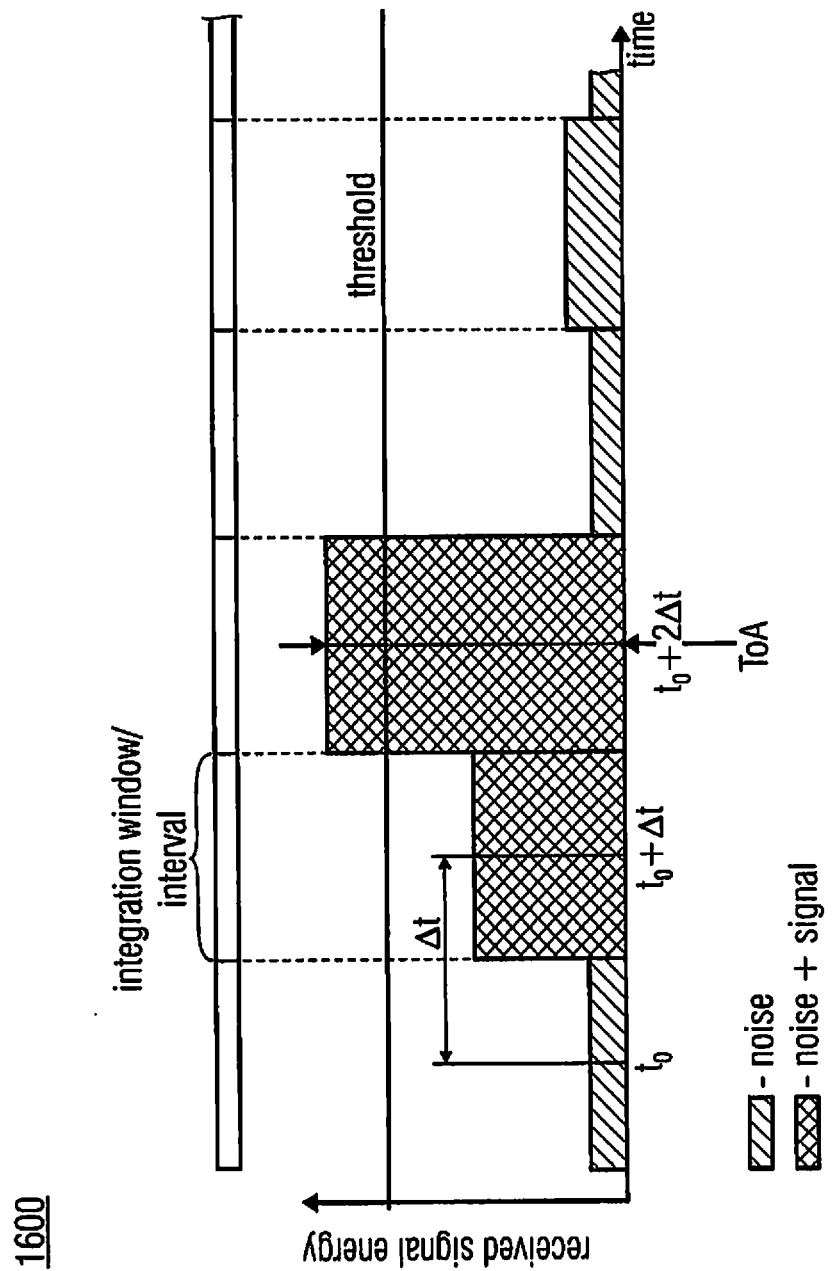
FIG. 16 shows a graph of an exemplary distribution of sampled integrator values according to conventional technology.

The inventive processing of the UWB ranging system may therefore be summarized in the ,following way. A UWB signal is received by the UWB antenna and amplified by the low noise amplifier (LNA). Next, it is filtered and squared $(\cdot)^2$. The resulting signal is integrated over a defined time which is called the integration window size. The integration window is shifted by the time $\Delta t_p$ in every signal acquisition. For the first acquisition $\Delta t_p = 0$ ns. Compared to a traditional structure of an ED receiver where sampling is performed in the middle of the integration windows which are separated by the sampling interval (i.e. $\Delta t = t_s$) as shown in FIG. 16, embodiment of the present invention are realized by shifting the windows by a small time $\Delta t_p$. This necessitates N signal acquisitions and hence a N repetitions of the UWB signal. The element responsible for shifts of the integration window is the time delay unit.

After sampling by the sampling and hold device (S&H), the analog-to-digital conversion is performed. The digital values of the signal energy contained in every window are compared against the threshold. The threshold itself may be selected based on a signal kurtosis estimate (such as in U.S. Pat. No. 7,526,048 B2). Next, the integration window of which the signal energy is above the threshold is selected and determines the ToA and also the estimated distance. The sampling can be performed in the middle of the integration window.

By comparing FIG. 8 and FIG. 16, it can be seen that in conventional technology, an uncertainty of the ToA is essentially given by the sampling clock period $\Delta t_s$ (i.e. the distribution contains the information that the ToA lies, for example, between 7.0 ns and 8.0 ns for $\Delta t_s = 1$ ns). However, in the inventive distribution as shown in FIG. 8, the uncertainty is approximately reduced to the time delay $\Delta t_p$ (i.e. the inventive distribution of FIG. 8 contains the information that the ToA lies, for example, between 7.4 and 7.5 ns for $\Delta t_p = 0.1$ ns and an exemplary indication "5").

Although the present invention has been described in the context of block diagrams where the blocks represent actual logical hardware components, the present invention can also be implemented by a computer-implemented method. In the latter case, the blocks represent corresponding method steps where these steps stand for the functionalities performed by the corresponding logical or physical hardware blocks.

The described embodiments are merely illustrative for the principles of the present invention. It is understood that modifications and variations of the arrangements and the details described herein will be apparent to others skilled in the art. It is the intent, therefore, to be limited only be scope of the appended patent claims and not by the specific details presented by way of description and explanation of the embodiments herein.

Dependent on certain implementation requirements of the inventive method, the inventive methods can be implemented in hardware or in software. The implementation can be performed using a digital storage medium, in particular disk, a DVD or CD having electronically, readable control signals stored thereon, which cooperate with programmable computer systems, such that the inventive methods are performed. Generally, the present invention can, therefore, be implemented as a computer program product with the program code stored on a machine readable carrier, the program code being operative for performing the inventive methods when the computer program product runs on a computer. In other words, the inventive methods are, therefore, a compute program having a program code for performing at least one of the inventive methods when the computer program runs on a computer. An inventive signal can be stored on any machine-readable storage medium, such as a digital storage medium.

Embodiments of the present invention provide a solution for avoiding a poor time resolution and related with it a relatively large ToA estimation error of the ED. An advantage of the present invention is that a high time- and thus distance-resolution ranging can be preformed with only one AD converter in the ED receiver and with realistic sampling rate of 1 GS/s or 500 MS/s. Moreover, no a-priori knowledge about the channel or about the signal is useful. Therefore, embodiments of the present invention provide a structure of a receiver which is relatively simple and feasible.

In a conventional matched filter/correlation receiver, the knowledge of the received pulse that may be used for this type of receiver may not be available in practice. Moreover, the waveform distortion induced by the near-field coupling between antenna and the propagation environment poses challenges on the accurate waveform representation in the receiver. As opposed to such a matched filter receiver, embodiments of the present invention may not require a Nyquist or higher rate sampling, and as a result, it will be feasible for low cost UWB devices. In the art, however, for a signal bandwidth of 2 GHz, a sampling rate of at least 4 GS/s is needed.

The advantage is illustrated by the following example. For the standard ED approach, time resolution is:

$$\Delta t = t_s = 1/f_s,$$

and distance resolution:

$$\Delta d = c\Delta t = c/f_s$$

where $c = 10^8$ m/s is the speed of light. For the sampling rate $f_s = 1$ GS/s, the resulting distance resolution $\Delta d = 30$ cm.

In the presented invention, time resolution is:

$$\Delta t_p = t_s/N = (f_s N_s)^{-1}$$

and distance resolution:

$$\Delta d_p = c\Delta t/N = c/(Nf_s,)$$

For N=20 signal acquisitions and a sampling rate of $f_s = 1$ GS/s, for example, the resulting distance resolution is $\Delta d_p = 1.5$ cm. It has to be noted that this resolution is calculated without averaging.

In summary, the present invention relates to an architecture of an energy detection receiver, which enables high resolution ranging via a time-of-arrival technique.

The present invention is advantageous because it does not require any a-priori knowledge about neither the receive pulse shape nor the channel and yet can achieve good results with lower sampling rates.

Embodiments of the present invention therefore provide a technique to achieve a centimeter accuracy using a non-coherent energy detection receiver in a ToA UWB ranging system. The presented technique allows for such a performance with the sampling rate as low as 1 GS/s or even 500 MS/s.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A receiver for determining a time measure depending on a time of arrival of a pulse signal comprising a sequence of pulses from a transmitter, comprising:
   an integrator comprising a variable and controllable integration window, extending from a starting point to an integrator sampling point;
   an integrator controller for controlling the integration window in a time-successive way so that the sampling points of successive integration windows are changed by a time delay from a current integration window to a later integration window, wherein the time delay is smaller than half of the integration window; and
   an output processor for generating the time measure as an indication indicating which later integration window comprises a sampled integrator value exceeding a threshold or being larger than a sampled integrator value for a timely preceding or timely succeeding integration window.

2. The receiver according to claim 1, further comprising a sampling clock generator for generating a sampling clock signal, wherein the sampling clock generator is connected to the integrator controller, and wherein the integrator controller is configured to introduce the time delay based on the sampling clock signal.

3. The receiver according to claim 2, wherein the integrator controller is set so that the time delay is introduced for each predetermined $(N_s+1)$th pulse of the sampling clock signal.

4. The receiver according to claim 1, wherein the integrator is configured to integrate an original or delayed pulse signal one time and not more than one time between two time adjacent clock events.

5. The receiver according to claim 1, wherein the integrator is set so that the integration is performed within a predefined integration window being smaller than or equal to a sampling clock period.

6. The receiver according to claim 1, wherein the integrator comprises a time delay unit controlled by the integrator controller, wherein the time delay unit is configured for delaying the pulse signal by increasing time delays over several successive pulses based on a control signal output by the integrator controller.

7. The receiver according to claim 6, wherein the time delay unit comprises a plurality of delay lines for successively processing the pulse signal and for feeding the successively processed signal to the output of the time delay unit, respectively, and wherein the plurality of delay lines comprises a changing number of individual delay line elements, wherein each individual delay line elements introduces the time delay, and wherein each individual delay line element is connected with a switch output of a preconnected switch and a switch input of a post-connected switch, wherein the plurality of switches is configured to perform a switching based on the control signal, so that, for an initial sampling period, the pulse signal is directly fed to the output of the time delay unit, and for successive sampling periods, the pulse signal is successively processed by the plurality of delay lines, so that the original or delayed pulse signal is acquired.

8. The receiver according to claim 1, wherein the integrator controller comprises a counter for counting pulses of a sampling clock signal to acquire a counter output signal, and wherein the integrator controller furthermore comprises a comparator which is configured to provide a control signal for the integrator, wherein the control signal is based on a comparison of the counter output signal with a predetermined threshold, and a counter reset signal for resetting the counter when the predetermined threshold is reached, wherein the predetermined threshold is reached for each $N_s$th pulse of the sampling clock signal, and wherein the integrator is controlled by the control signal, so that the time delay is introduced for each $(N_s+1)$th pulse of the sampling clock signal, and wherein the comparator is furthermore configured to generate a control information, wherein the control information indicates different delays to be used for the output processor, and wherein the different delays are acquired from successively introducing the time delay, respectively.

9. The receiver according to claim 1, wherein the integrator comprises an integration unit for integrating an original or delayed pulse signal in an integration window, wherein the integrator is configured to determine the starting point of the integration window dependent on a sampling clock event, to sample an integrator value at the integrator sampling point a time period later than the starting point, the time period being smaller than a sampling clock period, and to reset the integrator subsequent to the sampling point.

10. The receiver according to claim 9, wherein the integration unit is configured as a resistor capacitor integration unit comprising a switch, wherein the switch is configured to switch between an integrating and a non-integrating state of the integration unit with respect to a sampling clock period.

11. The receiver according to claim 1, wherein the integrator comprises a sampling and hold device for sampling an integration unit output signal, wherein the sampling and hold device is configured for generating the sampled integrator value signal by sampling the integration unit output signal at the integrator sampling point.

12. The receiver according to claim 1, wherein the output processor comprises a value selector for selecting a plurality of sampled integrator values for a predefined consecutive sampling block and for relating the selected sampled integrator values to corresponding delays indicated by a control information from the integrator controller, so that a distribution of sampled integrator values is acquired, a threshold selector being operative on the distribution of sampled integrator values to acquire a selected threshold, a comparator for determining a specific delay for which a sampled integrator value exceeds the selected threshold, wherein the specific delay is determined based on a comparison of the distribution of sampled integrator values with the selected threshold, and a ToA calculator for calculating a time of arrival of the pulse signal based on the determined specific delay.

13. The receiver according to claim 1, further comprising an analog-to-digital converter (ADC) for converting an analog signal output by the integrator into a digital signal for the output processor, wherein the integrator is configured as an analog circuit, and wherein the output processor is configured as a digital circuit.

14. A receiver for determining a localization of the same, comprising:
- a plurality of receivers according to claim 1 for determining at least two different ToAs of pulse signals each comprising a sequence of pulses from a plurality of transmitters; and
- a position calculator for calculating a current position of the receiver depending on the at least two different ToAs.

15. A method for determining a time measure depending on a time of arrival of a pulse signal comprising a sequence of pulses from a transmitter, comprising:
- providing a variable and controllable integration window, extending from a starting point to an integrator sampling point;
- controlling the integration window in a time-successive way so that the sampling points of successive integration windows are changed by a time delay from a current integration window to a later integration window, wherein the time delay is smaller than half of the integration window; and
- generating the time measure as an indication indicating which later integration window comprises a sampled integrator value exceeding a threshold or being larger than a sampled integrator value for a timely preceding or a timely succeeding integration window.

16. A method for determining a localization of a receiver, comprising:
- determining, according to claim 15, at least two different ToAs of pulse signals each comprising a sequence of pulses from a plurality of transmitters; and
- calculating a current position of the receiver depending on the at least two different ToAs.

17. A computer-readable digital storage medium having stored thereon a computer program having a program code for performing, when running on a computer or microprocessor, a method for determining a time measure depending on a time of arrival of a pulse signal comprising a sequence of pulses from a transmitter, the method comprising:
- providing a variable and controllable integration window, extending from a starting point to an integrator sampling point;
- controlling the integration window in a time-successive way so that the sampling points of successive integration windows are changed by a time delay from a current integration window to a later integration window, wherein the time delay is smaller than half of the integration window; and
- generating the time measure as an indication indicating which later integration window comprises a sampled integrator value exceeding a threshold or being larger than a sampled integrator value for a timely preceding or a timely succeeding integration window, when the computer program is executed on the computer.

18. A computer-readable digital storage medium having stored thereon a computer program having a program code for performing, when running on a computer or microprocessor, a method for determining a localization of a receiver, the method comprising:
- determining, according to claim 15, at least two different ToAs of pulse signals each comprising a sequence of pulses from a plurality of transmitters; and
- calculating a current position of the receiver depending on the at least two different ToAs, when the computer program is executed on the computer.

* * * * *